(12) United States Patent
Varghese et al.

(10) Patent No.: US 7,011,737 B2
(45) Date of Patent: Mar. 14, 2006

(54) TITANIA NANOTUBE ARRAYS FOR USE AS SENSORS AND METHOD OF PRODUCING

(75) Inventors: Oomman K. Varghese, State College, PA (US); Gopal Mor, State College, PA (US); Maggie Paulose, State College, PA (US); Craig A. Grimes, Boalsburg, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 10/817,354

(22) Filed: Apr. 2, 2004

(65) Prior Publication Data

US 2005/0224360 A1 Oct. 13, 2005

(51) Int. Cl.
*C23C 28/00* (2006.01)
*C23C 28/02* (2006.01)
*C25D 11/02* (2006.01)
*C25D 5/48* (2006.01)

(52) U.S. Cl. ............... 205/189; 205/171; 205/191; 205/192; 205/220

(58) Field of Classification Search ............... 205/171, 205/189, 191, 192, 193, 220, 224
See application file for complete search history.

(56) References Cited

U.S. PATENT DOCUMENTS

| | | | | |
|---|---|---|---|---|
| 3,180,807 | A | * | 4/1965 | Quinn ..................... 205/171 |
| 4,125,374 | A | | 11/1978 | Bode et al. .................. 23/232 |
| 5,367,283 | A | | 11/1994 | Lauf et al. ................... 338/34 |
| 5,451,920 | A | | 9/1995 | Hoffheins et al. ............ 338/34 |
| 5,952,040 | A | | 9/1999 | Yadav et al. ............. 427/126.3 |
| 6,006,582 | A | | 12/1999 | Bhandari et al. ............ 73/23.2 |
| 6,120,835 | A | | 9/2000 | Perdieu ..................... 427/125 |
| 6,202,471 | B1 | | 3/2001 | Yadav et al. ................ 73/31.05 |
| 6,344,271 | B1 | | 2/2002 | Yadav et al. ................. 428/402 |
| 6,535,658 | B1 | | 3/2003 | Mendoza et al. ............. 385/12 |
| 6,569,490 | B1 | | 5/2003 | Yadav et al. .................. 427/58 |
| 6,586,095 | B1 | | 7/2003 | Wang et al. ................ 428/397 |
| 6,596,236 | B1 | | 7/2003 | DiMeo, Jr. et al. ........... 422/88 |

(Continued)

FOREIGN PATENT DOCUMENTS

EP 1254870 A2 * 11/2002

(Continued)

OTHER PUBLICATIONS

Zuttel et al., "Thermodynamic Aspects of the Interaction of Hydrogen With Pd Clusters", Applied Surface Science, vols. 162-163 (no month, 2000), pp. 571-575.*

(Continued)

*Primary Examiner*—Edna Wong
(74) *Attorney, Agent, or Firm*—Macheledt Bales & Heidmiller LLP

(57) ABSTRACT

An electrical resistive device, including: an array of titania nanotubes open at an outwardly-directed end formed by anodizing at least a portion of a titanium layer; a plurality of palladium (or other noble metal) clusters having been deposited atop the nanotube array; and the nanotube array mechanically supported by an integral support member. The array of titania nanotubes may include a dopant. An exposure of titania nanotube array to radiant energy emitted within a range of frequencies from visible to ultraviolet, in the presence of oxygen, removes a contaminant, if present. The titanium layer may be deposited atop the integral support; or the unique doped titanium layer can be produced, prior to the anodizing thereof, by depositing titanium along with dopant atop the integral support member by a co-deposition process. Also, supported: method(s) of producing the electrical resistive devices.

4 Claims, 10 Drawing Sheets

U.S. PATENT DOCUMENTS

| | | | |
|---|---|---|---|
| 6,605,266 B1 | 8/2003 | Nesper et al. | 204/155 |
| 6,630,062 B1 | 10/2003 | Anderson et al. | 204/429 |
| 6,914,769 B1 * | 7/2005 | Welsch et al. | 361/508 |
| 2003/0047505 A1 | 3/2003 | Grimes et al. | 210/483 |
| 2005/0103639 A1 * | 5/2005 | Lu et al. | 205/322 |

FOREIGN PATENT DOCUMENTS

JP  2002236106 A * 8/2002

OTHER PUBLICATIONS

Varghese et al., "Crystallization and High-Temperature Structural Stability of Titanium Oxide Nanotube Arrays", J. Mater. Res., vol. 18, No. 1, Jan. 2003, pp. 156-165.*

Gong, D., Craig A. Grimes, and Ooman K. Varghese, "Titanium oxide nanotube arrays prepared by anodic oxidation," *J. Mater. Res.*, vol. 16, No. 12, Dec. 2001.

Varghese, O. K., Dawei Gong, Maggie Paulose, Craig A. Grime, Elizabeth C. Dickey, "Crystallization and high-temperature structural stability of titanium oxide nanotube arrays," *J. Mater. Res.*, vol. 18, No. 1, Jan. 2003.

Zuttel, A., Ch. Nutzenadel, G. Schmid, Ch. Emmenegger, P. Sudan, L. Schlapbach, "Thermodynamic aspects of the interaction of hydrogen with Pd Clusters," *Applied Surface Science*, 162-163 (2000) 571-575, no month.

* cited by examiner

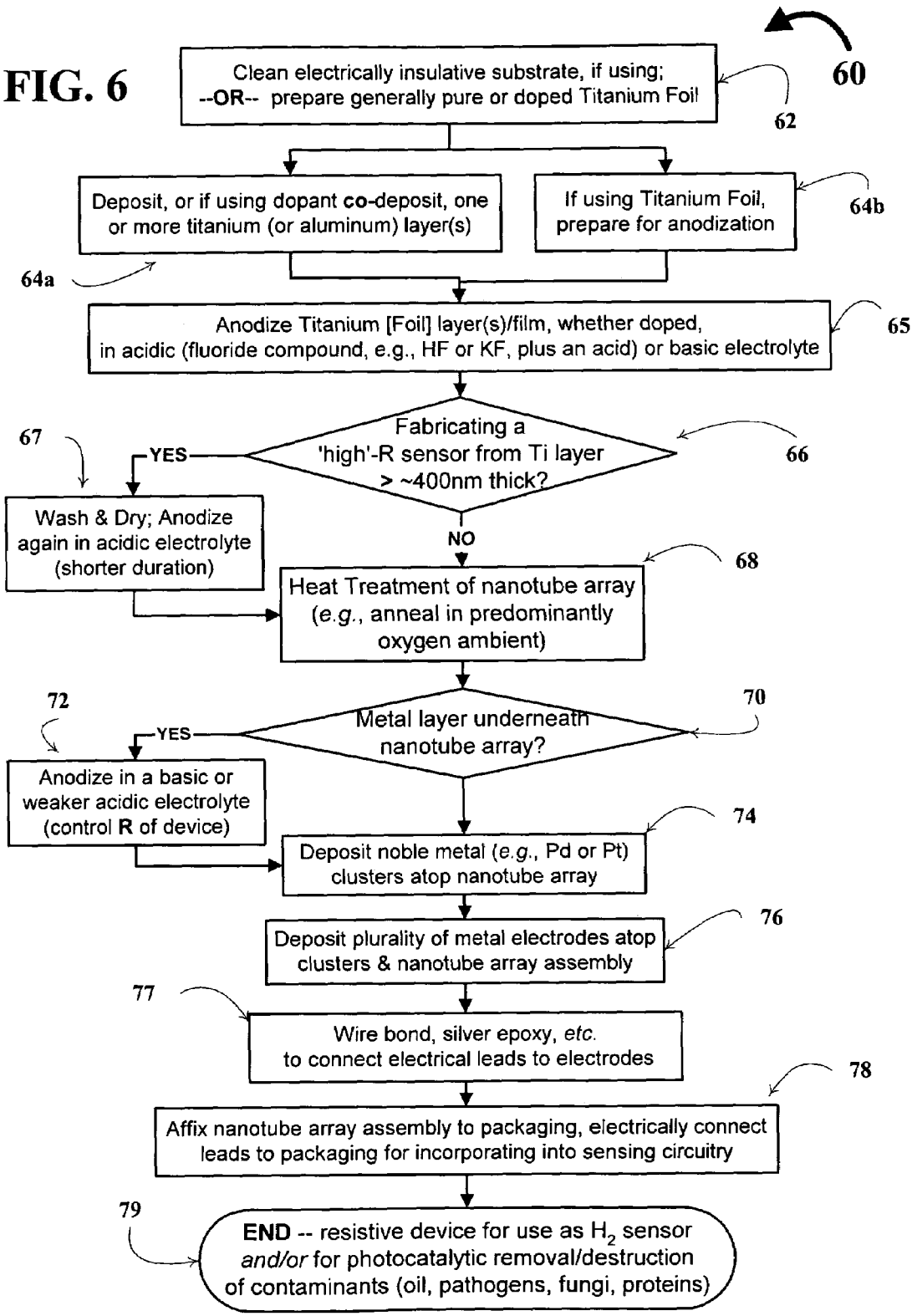

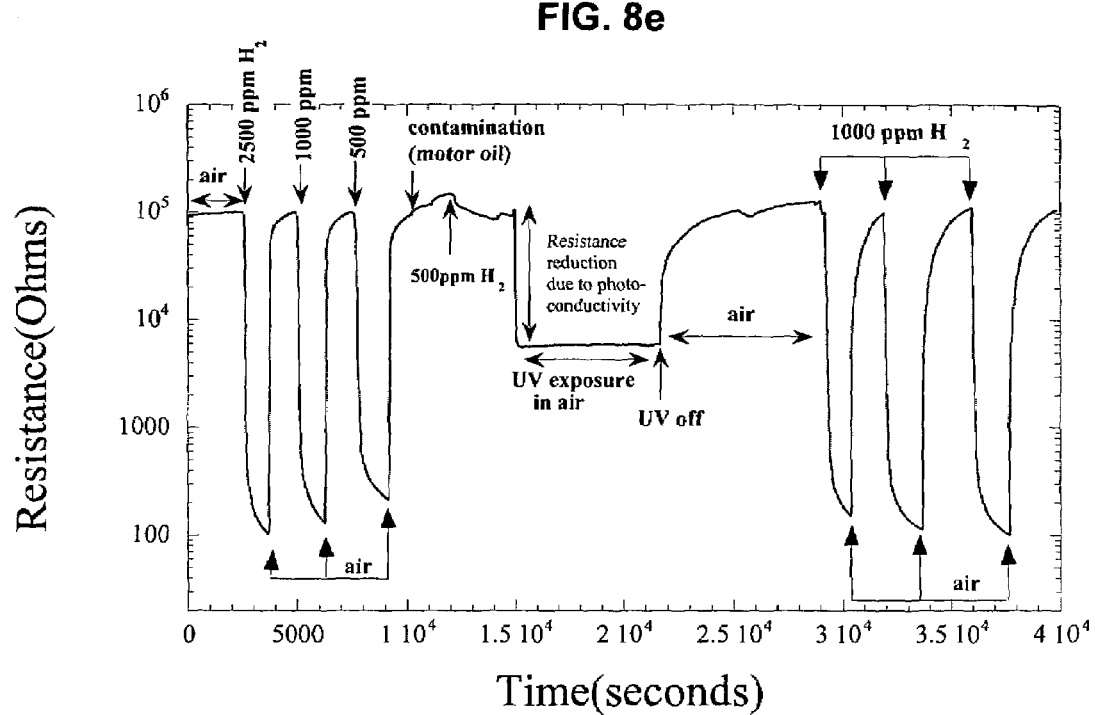
FIG. 8e
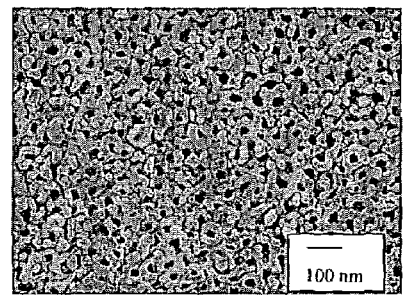 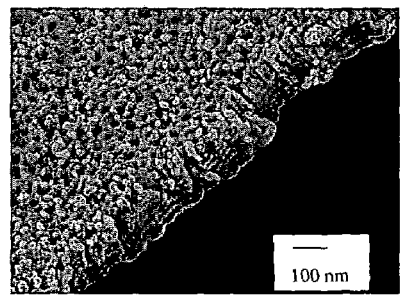
FIG. 9a  FIG. 9b

TITANIA NANOTUBE ARRAYS FOR USE AS SENSORS AND METHOD OF PRODUCING

BACKGROUND OF THE INVENTION

FIELD OF THE INVENTION

In general, the present invention relates to techniques for producing nanoporous membranes, or arrays, utilizing anodization to create nanotubular structures for specialized applications. More-particularly, the invention is directed to unique electrical resistive devices for use to sense the presence of hydrogen gas having an array of titania nanotubes open at an outwardly-directed end, and mechanically supported by an integral support member comprised of one or more layers such as an electrically insulative 'base' substrate layer, conductive foil substrate layer, metal-oxide layer(s), conductive metal layers deposited atop other layers (e.g., atop an insulative layer), alumina nanoporous structure, and so on. Moreover, the electrical devices are adaptable for use to photocatalytically remove one or more contaminants from the array of titania nanotubes: By exposing the titania nanotube devices to radiant energy emitted over a preferred range of frequencies, namely radiation emitted from visible to ultraviolet (UV) frequencies, visible region is ~$4.0\times10^{14}$ Hz–$7.5\times10^{14}$ Hz, corresponding to wavelengths within the range of 700 nm–400 nm (UV region is $\lambda$=400–300 nm, f=$7.5\times10^{14}$ to $1.0\times10^{15}$ Hz) in the presence of oxygen, contaminants such as liquid crude petroleum, pathogens (for example, virus and bacteria), organisms such as fungi (including yeast), and proteins may be removed from the nanotubes and further split into their molecular constituent(s). As will be appreciated, the photocurrent(s) generated within the nanotubular structures along with oxidation reaction, provides a 'self-clean' capability of the devices of the invention. This is extremely valuable in many environments, whether such contaminants are anticipated, for prolonging useful life of the electrical devices and for other related uses.

For improving sensitivity to hydrogen gas over a larger range of operational temperature, clusters of a noble metal such as platinum (Pt), and more-preferably palladium (Pd), are deposited, or 'sprinkled', atop the titania nanotubes after crystallization thereof (e.g., by annealing for a period of time, resulting in crystallized titania having both anatase and rutile phases). The clusters may be deposited using conventional deposition techniques such as: sputtering, evaporation using thermal energy, E-beam evaporation, ion assisted deposition, ion plating, electrodeposition (also known as electroplating), screen printing, chemical vapor deposition, molecular beam epitaxy (MBE), electroless deposition, and laser ablation. For purposes of increasing sensitivity to hydrogen, the palladium is deposited as clusters, and not a uniform layer; the palladium layer promotes catalytic dissociation of hydrogen molecules, the ions of which are then adsorbed on the surface of the $TiO_2$ nanotubes.

The array of titania nanotubes may be produced from a titanium layer deposited atop the integral support member using conventional film deposition techniques such as: sputtering, evaporation using thermal energy, E-beam evaporation, ion assisted deposition, ion plating, electrodeposition (also known as electroplating), screen printing, chemical vapor deposition, molecular beam epitaxy (MBE), laser ablation, and so on. The titania nanotubes may be produced from a doped titanium layer, whereby the titanium and dopant are co-deposited atop the integral support member using convention film co-deposition techniques such as: co-sputtering, co-evaporation using thermal energy, E-beam evaporation, ion assisted deposition, ion implantation, ion plating, chemical vapor deposition, laser ablation, and thermal diffusion of said dopant into a deposited titanium matrix. Alternatively, the titania nanotubes may be formed by anodizing an outwardly-directed surface (e.g., the 'top') of titanium foil or doped titanium foil. The array of titania nanotubes may be formed by exposing an outwardly-directed surface of a doped- or undoped-titanium foil/layer to an acidic electrolyte solution comprising a fluoride compound and an acid, or a basic electrolyte solution, at a voltage selected from a range from 100 mV to 40V, for a selected time-period.

One of the applicants hereof, in a patent application filed on behalf of a different assignee, details the process of anodizing nanoporous membranes to produce a tubular filter. In this application has since published, US-2003-0047505-A1 on 13 Mar. 2003, by way of background reference concerning anodizing of metals, applicants Grimes & Gong of US-2003-0047505-A1 explain, as quoted below:

> . . . More-particularly, the invention is directed to a nanoporous tubular filter and associated method for producing a tubular filter having a membrane of generally branched pores formed by anodization of a section of metal tubing, integral with an outer support matrix conveniently formed out of an outer wall of the section of tubing. The filter is preferably produced from a section of metal tubing. While the nanoporous filter of the invention is targeted for biofiltration and gas separation, such as for controlling molecular transport in immunoisolation applications, it can accommodate a wide variety of filtration uses. For example, where a diffusion rate of a particular component of a mixture is specified and filtration of another molecule within the mixture is desired, the porous membrane is comprised of at least two 'layers' of branched pores, one layer having pores sized to allow the smaller molecules to diffuse at the specified rate with the other layer having smaller-sized pores impermeable to the molecule selected for filtration. The layer thickness and pore size of the membrane is controlled during the anodization of the section of metal tubing.

Where traditional fabrication and use of anodized multilayer porous membranes has been limited to planar structures with pore size ranging greater than 40 nanometers, those that are fabricated with a pore size less than 40 nanometers using conventional techniques create very fragile brittle porous structures that are difficult to handle without breakage. Thus, conventional filter fab techniques fall short when trying to fabricate a filter having small sized pores. The unique nanoporous filter of the invention is a tubular filter structure having both a branched porous membrane and an integral outer support matrix made from that portion of the section of metal tubing generally left unanodized. This branched network includes a layer of larger-sized pores and a thinner layer of smaller sized pores ($\leq 40$ nanometers) impermeable to those molecules the filter has been designed to keep-out, or filter/trap. For example, a tubular filter produced according to the invention may be permanently capped at each end to create small capsules through which a selected nutrient or therapeutic drug may pass, yet impermeable to undesirable immunological molecules outside the capsule.

While the focus of the invention is on anodizing sections of aluminum or titanium tubing, other metals and alloys capable of transformation into a generally branched multilayer porous network may be used to the extent an outer support matrix can be integrated therewith for additional structural integrity according to the invention. One key feature of the invention is that the layer of the membrane having the smaller-sized pores, ranging from 5 to 40 nanometers, need not be very thick, allowing the layer(s) of larger-sized pores-ranging anywhere from 30 to 200 nanometers depending upon factors such as the specific filtration application, size distribution of the molecule(s) that will pass through the membrane, and desired rate of diffusion—to make up a larger portion of membrane wall thickness, thus providing better structural integrity. The integration of an outer support matrix fabricated from an outer wall of tubing material provides further mechanical strength for handling and use in a multitude of environments including those considered caustic, as well as pressurized, aqueous or other liquid, or gas environments.

General technical background reference—Anodization: The anodization of aluminum and other metals is a well known process. Distinguishable from the instant invention, is Furneaux, et al. (U.S. Pat. No. 4,687,551)—its technical discussion incorporated herein by reference—which details a process to anodize an aluminum sheeting substrate at different applied voltages, incrementally reduced in small steps down to a level preferably below 3 V. The Furneaux, et al. process results in a very fragile planar alumina film— . . . . Several paragraphs of Furneaux, et al's technical discussion concerning the anodizing of aluminum— . . . —have been reproduced below:

When an aluminum [sic] metal substrate is anodized in an electrolyte such as sulphuric acid or phosphoric acid, an anodic oxide film is formed on the surface. This film has a relatively thick porous layer comprising regularly spaced pores extending from the outer surface in towards the metal; and a relatively thin non-porous barrier layer adjacent the metal/oxide interface. As anodizing continues, metal is converted to oxide at the metal/oxide interface, and the pores extend further into the film, so that the thickness of the barrier layer remains constant. The cross-section and spacing of the pores and the thickness of the barrier layer are all proportional to the anodizing voltage.

Anodizing conditions . . . . Direct current is preferably used, but alternating, pulsed or biased current may be used. An electrolyte is used that gives rise to a porous anodic oxide film, sulphuric, phosphoric, chromic and oxalic acids and mixtures and these being suitable. Although electrolytes are generally acid, it is known to be possible to use alkaline electrolytes such as borax, or even molten salt electrolytes. It is believed to be the simultaneous dissolution/film formation mechanism that gives rise to porous films, and this mechanism can operate in an acid or alkaline environment. . . .

END quotation from Grimes & Gong of US-2003-0047505-A1.

A Need for a New Titania Nanotube Framework. In earlier published work concerning titania nanotubes, the applicants hereof focused on generating titania nanotube structures built from titanium foils, providing early generation structures, laying the groundwork for analysis of titania nanotubes: Gong, D., Craig A. Grimes, and Oomman K. Varghese, "Titanium oxide nanotube arrays prepared by anodic oxidation," *J. Mater. Res.*, Vol. 16, No. 12, December 2001; and Varghese, O. K., Dawei Gong, Maggie Paulose, Craig A. Grime, Elizabeth C. Dickey, "Crystallization and high-temperature structural stability of titanium oxide nanotube arrays," *J. Mater. Res.*, Vol. 18, No. 1, January 2003. The early titania nanotube arrays formed from titanium foils using the anodization technique described in Gong, et al. (December 2001) were quite brittle. By varying the anodization potential from 10 to 23V, the inner diameter of the nanotubes were varied from 22 nm to 96 nm. The array thickness ranged from 200 nm to 500 nm depending upon the anodization potential. The nanotubes were amorphous at room temperature and crystallized in anatase phase at about 280° C., Varghese, et al. (January 2003). The anatase to rutile conversion started at about 430° C. The nanotubes were stable till about 580° C. above which the structure started disintegrating. Thus, it was recognized that their early structures produced out of generally pure titanium foil had drawbacks. The thickness of nanotube array using the fabrication technique described in Gong, et al. (December 2001) could not be increased above ~600 nm due to the limitation(s) of that process. Through their groundbreaking work, applicants recognized the need for a more flexible framework.

New Titania Nanotube Array for Hydrogen Sensing and Contaminant Removal. The titania nanotube structures of the invention are uniquely adapted for hydrogen sensing applications and for 'self clean' contaminant removal functionalities as set fourth herein. One concern of a sensor platform is the potential for undesirable contamination, or poisoning, which introduces spurious measurements and shorten the 'useful life' of a sensor. Sensors used in non-controlled environments face potential contamination from volatile organic vapors, carbon soot, oil vapors, as well as dust, pollen, pathogens, and organisms (fungi, including yeasts), to name a few. The sensing device of the invention is provided with a 'self-clean' capability, thereby extending useful life and minimizing the potential for spurious measurements. While $TiO_2$ has known utility as a gas sensor for certain gasses, and the ability of $TiO_2$ to photocatalytically degrade several organic materials, pesticides, and herbicides is known, the novel resistive devices described and supported herein for sensing hydrogen gas, provide a further unique contaminant removal/destruction capability.

Applicants earlier reported the ability to crystallize amorphous titania nanotubes with a high temperature anneal, Varghese, et al. (January 2003); both anatase and rutile phase are present after a 6 hr 500° C. anneal in oxygen. The anatase phase is preferable for photocatalytic properties, while the rutile phase of titania nanotubes promotes hydrogen sensing capacity. As one will appreciate, distinguishable from conventional hydrogen sensors and from applicants' own earlier titania nanoporous structures, are the devices of the invention, and associated method for producing these devices according to the invention. Within the spirit and scope of the instant technical disclosure, the devices of the invention may be operated at a wide range of temperatures (room temp., ~24° C., to ~400° C., by way of example). Furthermore the photocatalytic properties of the devices are such that the hydrogen sensing capabilities of the devices are largely recovered by UV light exposure, after being completely extinguished by the rather extreme means of sensor contamination, such as immersion of the device in motor oil.

SUMMARY OF THE INVENTION

It is a primary object of this invention to provide resistive devices for sensing hydrogen gas as well as devices that further have contaminant removal/destruction capability. The resistive devices incorporate titania nanotube array structure(s) mechanically supported by an integral support member having one or more layers such as an electrically insulative 'base' substrate layer, conductive foil substrate layer, metal-oxide layer(s), conductive metal layers deposited atop other layers, an alumina nanoporous structure, and so on. The resistive devices, incorporated within suitable, known sensing circuitry, detect change(s) in resistance of the device upon exposure to hydrogen gas. A change in resistance is quantifiably calibrated for translating into measurements that can be read off display/LED/meter, or into warning signals upon hitting a threshold hydrogen gas level, and so on. Furthermore, in the event one or more of a variety of contaminants is present, upon exposure of the device to radiant energy emitted in the visible to ultraviolet ranges, in the presence of oxygen, removal and/or destruction of the contaminant may be carried out.

Briefly described, once again, the invention includes, in a first characterization, an electrical resistive device for sensing hydrogen gas, including: (a) an array of titania nanotubes open at an outwardly-directed end formed by anodizing at least a portion of a titanium layer; (b) a plurality of palladium clusters having been deposited atop the nanotube array; and (c) the nanotube array mechanically supported by an integral support member. In another characterization, the resistive device comprises: (a) an array of titania nanotubes comprising a dopant in an amount less than 1% by mass (which, as is known, corresponds with 10,000 ppm); (b) a plurality of palladium clusters having been deposited atop said array of titania nanotubes; and (c) the array of nanotubes mechanically supported by an integral support member.

In another characterization, the electrical resistive device includes: (a) an array of titania nanotubes mechanically supported by an integral support member; (b) a plurality of clusters of a noble metal having been deposited atop the titania nanotube array after a heat treatment is performed thereto; and (c) whereby an exposure of the titania nanotube array to radiant energy emitted within a range of frequencies from visible to ultraviolet, in the presence of oxygen, removes at least a portion of a contaminant, if present on the titania nanotubes.

In yet another characterization, an electrical resistive device of the invention is disclosed and supported having: (a) an array of nanotubes open at an outwardly-directed end formed by anodizing at least a portion of a titanium layer comprising a dopant; (b) the array of nanotubes having been heat treated; (c) the array of nanotubes mechanically supported by an integral support member; and (d) the unique doped titanium layer having been produced, prior to the anodizing thereof, by depositing titanium and the dopant atop the integral support member by a co-deposition process. The device, as adapted for use to remove a contaminant (such as liquid crude petroleum, pathogens, e.g., virus, bacteria, fungi, and proteins) from the array of nanotubes, will do so photocatalytically by exposure thereof to radiant energy emitted within a range of frequencies from visible to ultraviolet, in the presence of oxygen.

The array of titania nanotubes may be produced from a titanium layer deposited atop the integral support member using conventional film deposition techniques such as: sputtering, evaporation using thermal energy, E-beam evaporation, ion assisted deposition, ion plating, electrodeposition (or, electroplating), screen printing, chemical vapor deposition, molecular beam epitaxy (MBE), laser ablation, and so on. The titania nanotubes may be produced from a doped titanium layer, whereby the titanium and dopant are co-deposited atop the integral support member using convention film co-deposition techniques such as: co-sputtering, co-evaporation using thermal energy, E-beam evaporation, ion assisted deposition, ion implantation, ion plating, chemical vapor deposition, laser ablation, and thermal diffusion of said dopant into a deposited titanium matrix. The dopant is preferably introduced as an 'impurity' into the titanium at a concentration from a few ppb to less than ~10,000 ppm, and can comprise one or more materials such as: Pd, Pt, Sb, $Sb_2O_3$, In, $Bi_2O_3$, Ru, Nb, Ni, MgO, Au, Cr, Ag, Cu, N, and C. Alternatively, the titania nanotubes may be formed by anodizing an outwardly-directed surface, e.g., the 'top/upper' layer of a titanium foil or doped titanium foil. Thus, as mentioned, a wide variety of integral support member configurations are contemplated for mechanically supporting the nanotube array. For example, the integral support member may be composed of a metal-oxide layer interposed between a 'base' electrically insulative substrate layer and the array of titania nanotubes, with an oxidized barrier layer atop the metal-oxide layer. The integral support member may be composed of the remaining portion of Ti layer or doped Ti layer not anodized, should a Ti or doped Ti foil be used. Also, the integral support member may include an alumina nanoporous structure interposed between a conductive 'base' substrate layer and a metal-oxide layer.

The array of titania nanotubes may be formed by exposing an outwardly-directed surface of a doped- or undoped-titanium foil/layer to an acidic electrolyte solution comprising a fluoride compound (for example, hydrogen fluoride, HF, potassium fluoride, KF, etc.) and one or more acid (for example, acetic acid, $CH_3COOH$ or HAC, sulfuric acid, $H_2SO_4$, phosphoric acid, $H_3PO_4$, chromic acid, $H_2CrO_4$, $K_2HPO_4$, and so on), or a basic electrolyte solution (for example, one that comprises potassium hydroxide, KOH), at a voltage selected from a range from 100 mV to 40V, for a selected time-period within a range such as from 1 minute to 24 hrs., or so. In many cases, a thin oxidized barrier layer is formed at the base of the array of nanotubes; the thickness of this barrier layer may be controlled by varying anodizing parameters. The palladium (Pd) or other noble metal such as Platinum (Pt) may be deposited atop the array of nanotubes by using a metal deposition technique such as: sputtering, evaporation using thermal energy, E-beam evaporation, ion assisted deposition, ion plating, electrodeposition, screen printing, chemical vapor deposition, molecular beam epitaxy (MBE), electroless deposition, and laser ablation. A plurality of metal electrode-contacts such as gold, Pt, Pd, Ruthenium, Al, indium tin oxide, fluorine-doped tin oxide, and various alloys thereof, may be deposited atop the nanotube array.

In another aspect of the invention associated with the resistive device(s), the focus on a method of producing the unique electrical resistive device(s) of the invention. In one characterization the unique method includes the steps of: (a) forming an array of titania nanotubes open at an outwardly-directed end by anodizing at least a portion of a titanium layer; (b) depositing a plurality of palladium clusters atop the array of titania nanotubes by performing a deposition process; and (c) said array of titania nanotubes being mechanically supported by an integral support member. The palladium clusters may be deposited via suitable technique such as: sputtering, evaporation using thermal energy, E-beam evaporation, ion assisted deposition, ion plating, electrodeposition, screen printing, chemical vapor deposition, molecular beam epitaxy (MBE), electroless deposition, and laser ablation. The step of forming the array may include: exposing an outwardly-directed surface of the titanium layer, which may have a thickness of from several-hundred nanometers (nm) to tens-of-microns ($\mu$m), to an acidic electrolyte solution comprising a fluoride compound and an acid, or a basic electrolyte at a voltage selected from a range from 100 mV to 40V, for a selected time-period within a range of 1 minute to 24 hours.

There are many further distinguishing features of the method of producing electrical resistive device(s) according to the invention. Once again, deposition of the titanium layer atop the integral support member can include one of the following: sputtering, evaporation using thermal energy, E-beam evaporation, ion assisted deposition, ion plating, electrodeposition, screen printing, chemical vapor deposition, molecular beam epitaxy (MBE), and laser ablation. Where the titanium layer is a titanium foil layer, forming the array may comprise exposing an outwardly-directed surface of the foil layer to an acidic (alternatively, basic) electrolyte solution, leaving a substrate layer comprised of a portion of the foil layer that is not anodized—the integral support member being made up of this remaining titanium foil substrate layer. Further, exposing the array of titania nanotubes to radiant energy emitted within a range of frequencies from visible to ultraviolet, in the presence of oxygen, the device may be 'photocatalytically activated' to remove at least a portion of a contaminant present on the titania nanotubes, such as liquid crude petroleum, pathogens (for example, virus and bacteria), organisms such as fungi (including yeast), proteins, etc.

In another characterization, a method of producing an electrical resistive device for sensing hydrogen gas, is supported comprising the steps of: (a) forming an array of titania nanotubes open at an outwardly-directed end by anodizing at least a portion of a titanium layer comprising a dopant in an amount less than 1% by mass; (b) depositing a plurality of palladium clusters atop the array of titania nanotubes; and (c) said array of titania nanotubes being mechanically supported by an integral support member. Prior to the anodizing, the titanium and selected dopant can be co-deposited atop the integral support member by employing a technique such as: co-sputtering, co-evaporation using thermal energy, E-beam evaporation, ion assisted deposition, ion implantation, ion plating, chemical vapor deposition, laser ablation, and thermal diffusion of said dopant into a deposited titanium matrix. Where the titanium layer is a doped titanium foil layer, the step of forming the array can include exposing an outwardly-directed surface of the doped titanium foil layer to an electrolyte solution, leaving a substrate layer comprised of a portion of the doped titanium foil layer that is not anodized—the integral support member being made up of this remaining doped titanium foil substrate layer.

In another characterization, a method of producing an electrical resistive device for sensing hydrogen gas, is supported comprising the steps of: (a) forming an array of titania nanotubes open at an outwardly-directed end by anodizing at least a portion of a first titanium layer; (b) prior to said anodizing, depositing the first titanium layer atop said integral support member, which comprises an electrically insulative substrate layer, by performing a deposition process such as: sputtering, evaporation using thermal energy, E-beam evaporation, ion assisted deposition, ion plating, electrodeposition, screen printing, chemical vapor deposition, molecular beam epitaxy (MBE), and laser ablation; (c) thereafter, depositing a second titanium layer, leaving a portion of the first titanium layer uncovered; and (d) depositing a plurality of metal electrode-contacts atop the titania nanotubes so formed.

In yet another characterization, a method of producing an electrical resistive device for sensing hydrogen gas, is supported comprising the steps of: (a) forming an array of titania nanotubes open at an outwardly-directed end by anodizing at least a portion of a titanium layer; (b) prior to anodizing, depositing an aluminum layer atop the integral support member, which comprises an electrically insulative substrate layer; (c) after depositing the aluminum layer, depositing the titanium layer atop the aluminum layer by performing a deposition process (such as: sputtering, evaporation using thermal energy, E-beam evaporation, ion assisted deposition, ion plating, electrodeposition, screen printing, chemical vapor deposition, molecular beam epitaxy (MBE), and laser ablation); and (d) after anodizing the assembly, heat treating the array of titania nanotubes in the presence of oxygen forming a titanium-oxide layer interposed between the aluminum layer and the array of titania nanotubes.

As one will appreciate, certain of the several unique features, and further unique combinations of features, as supported and contemplated in the instant technical disclosure may provide a variety of advantages; among these include: (a) Design flexibility and versatility—The basic structure of the resistive electrical device(s) is adaptable for incorporation in a variety of packing types tailored for use in a variety of environments, shaped and sized to accommodate space limitations; (b) Dual-mode operability—The invention functions as a hydrogen gas sensor and for removing/destroying a variety of contaminants, including those specified herein in connection with photocatalytic removal/destruction upon exposing the titania nanotubes to radiant (visible—UV) energy in the presence of oxygen; and (c) Manufacturability—The unique multi-step method of producing electrical resistive devices of the invention can be tailored to reproduce/fabricate such devices on a wide scale allowing for assembly line production in an economically feasible manner. These and other advantages of providing the new device structures and associated method of producing the devices, will be appreciated by perusing the instant technical discussion, including the drawings, claims, and abstract, in light of drawbacks to existing nanoporous structures identified, including the results of applicants earlier reported groundwork research, or that may be uncovered.

BRIEF DESCRIPTION OF THE DRAWINGS

For purposes of illustrating the innovative nature plus the flexibility of design and versatility of the preferred nanotube array structures and method of producing disclosed hereby, the invention will be better appreciated by reviewing the accompanying drawings (in which like numerals, if included, designate like parts). One can appreciate the many features that distinguish the instant invention from known nanoporous structures and fabrication thereof. The drawings have been included to communicate the features of the innovative design, structure, and associated technique of the invention by way of example, only, and are in no way intended to unduly limit the disclosure hereof.

FIG. 6 is a flow diagram depicting details of a method 60 for producing titania nanotube array structures—illustrated are core, as well as further distinguishing/additional, features of the invention for producing structures such as those represented and/or depicted in FIGS. 1A–1E, 2A–2E, 3A–3E, 4, 5A–5B, 7, and 9A–9B.

FIG. 8a (device behavior from t=10 s to 1000 s), FIG. 8b (t=100 s–6000 s); FIG. 8c (t=5000 s–45,000 s); and FIG. 8d (t=45,000 s–70,000 s).

FIG. 8e graphically depicts another plot of real-time variation of resistance change before, during, and after exposing a titania nanotube array to radiant UV energy in the presence of oxygen to remove a contaminant (once again, liquid crude petroleum).

FIGS. 9a–9b are, respectively, top-plan view and side-view cross-sectional Scanning Electron Micrograph (SEM) images of a titania nanotube array structure of the invention.

DETAILED DESCRIPTION OF THE EMBODIMENTS DEPICTED IN THE DRAWINGS

Figure 3A:
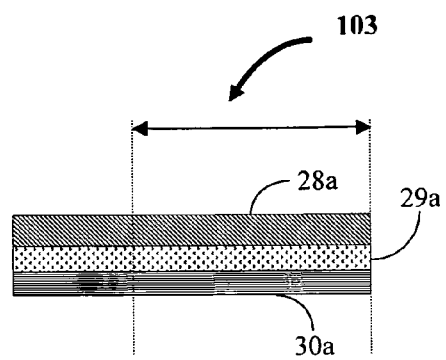
FIGS. 3A–3F depict another preferred alternative nanotube array structure at various stages of fabrication, according to the invention, in chronological, step-wise fashion; similar features of the six cross-sectional views are labeled, accordingly.
Figure 4:
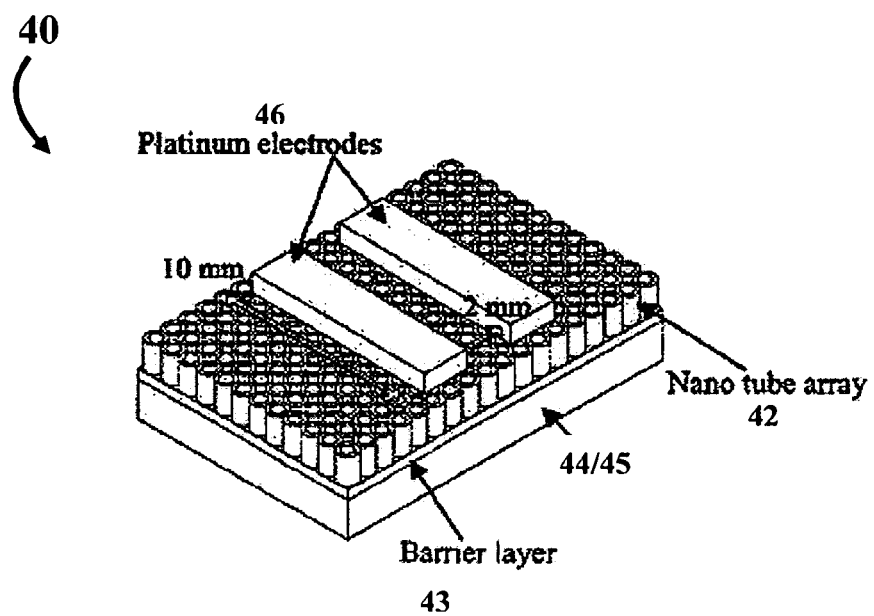
FIG. 4 is a schematic isometric view representative of a nanotube array structure such as is depicted by FIGS. 1E, 2F, and 3F.
Figure 5A:
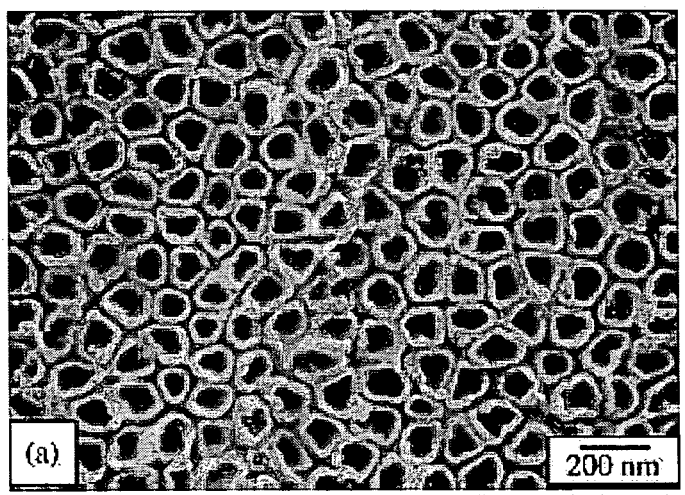
FIGS. 5a–5b are, respectively, top-plan view and side-view cross-sectional Field Emission Scanning Electron Microscopy (FE-SEM) images of an alternative titania nanotube array (such as those arrays schematically depicted in section, at 14b–14e of FIGS. 1A–1E, 22b–22f of FIGS. 2A–2F, and 31b–31f of FIGS. 3A–3F) of a device of the invention.
Figure 5B:
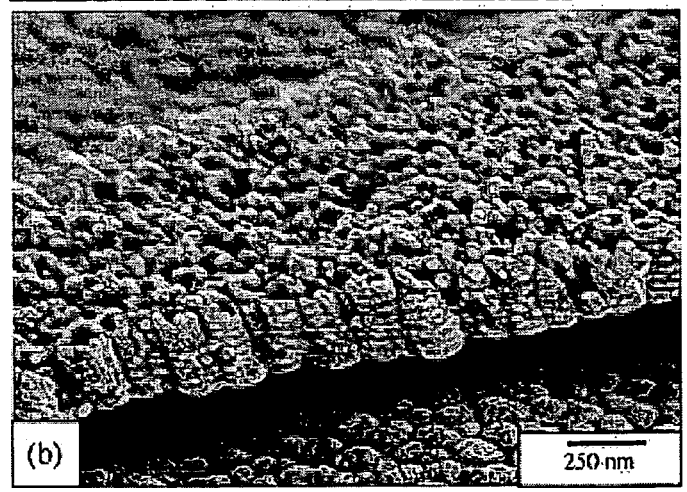

Each set of figures labeled FIGS. 1A–1E, FIGS. 2A–2F, and FIGS. 3A–3F depict preferred alternative nanotube array structures at various stages of fabrication, according to the invention, in chronological, step-wise fashion. Similar features of the five/six cross-sectional views are labeled, accordingly. FIG. 4 is a schematic isometric view representative of a nanotube array structure such as is depicted by FIGS. 1E, 2F, and 3F. FIGS. 5A–5B are, respectively, top-plan view and side-view cross-sectional Field Emission Scanning Electron Microscopy (FE-SEM) images of an alternative titania nanotube array (such as those arrays schematically depicted in section, at 14b–14e of FIGS. 1A–1E, 22b–22f of FIGS. 2A–2F, and 31b–31f of FIGS. 3A–3F). Reference back-and-forth to these several figures will be done in connection with FIG. 6 (detailing features of a method 60 for producing the devices of the invention in flow-diagram format) to better appreciate the features of the nanotube array structures depicted throughout.

Once again as explained, in connection with reviewing the examples depicted by FIGS. 1 through 5, the method in FIG. 6, and other supporting figures, one will appreciate that: The array of titania nanotubes may be produced from a titanium layer deposited atop the integral support member (step 64a, FIG. 6) using conventional film deposition techniques such as: sputtering, evaporation using thermal energy, E-beam evaporation, ion assisted deposition, ion plating, electrodeposition (or, electroplating), screen printing, chemical vapor deposition, molecular beam epitaxy (MBE), laser ablation, and so on. The titania nanotubes may be produced from a doped titanium layer, whereby the titanium and dopant are co-deposited atop the integral support member (step 64a, FIG. 6) using convention film co-deposition techniques such as: co-sputtering, co-evaporation using thermal energy, E-beam evaporation, ion assisted deposition, ion implantation, ion plating, chemical vapor deposition, laser ablation, and thermal diffusion of said dopant into a deposited titanium matrix. The dopant is preferably introduced as an 'impurity' into the titanium at a concentration from a few ppb to less than ~10,000 ppm, and can comprise one or more materials such as: Pd, Pt, Sb, $Sb_2O_3$, In, $Bi_2O_3$, Ru, Nb, Ni, MgO, Au, Cr, Ag, Cu, N, and C. Alternatively (step 64b, FIG. 6), the titania nanotubes may be formed by anodizing an outwardly-directed surface, e.g., the 'top/upper' layer of a titanium foil or doped titanium foil. Thus, as mentioned, a wide variety of integral support member configurations are contemplated for mechanically supporting the nanotube array (step 62, FIG. 6). For example, the integral support member may be composed of a metal-oxide layer interposed between a 'base' electrically insulative substrate layer and the array of titania nanotubes, with an oxidized barrier layer atop the metal-oxide layer. The integral support member may be composed of the remaining portion of Ti layer or doped Ti layer not anodized, should a Ti or doped Ti foil be used (step 64b, FIG. 6). The integral support member may also have an alumina nanoporous structure interposed between a conductive 'base' substrate layer and a metal-oxide layer.

The array of titania nanotubes may be formed (step 65, FIG. 6) by exposing an outwardly-directed surface of a doped- or undoped-titanium foil/layer to an acidic electrolyte solution comprising a fluoride compound (for example, hydrogen fluoride, HF, potassium fluoride, KF, etc.) and one or more acid (for example, acetic acid, $CH_3COOH$ or HAC, sulfuric acid, $H_2SO_4$, phosphoric acid, $H_3PO_4$, chromic acid, $H_2CrO_4$, $K_2HPO_4$, and so on), or a basic electrolyte solution (for example, one that comprises potassium hydroxide, KOH), at a voltage selected from a range from 100 mV to 40V, for a selected time-period within a range such as from 1 minute to 24 hrs., or so. In many cases, a thin oxidized barrier layer is formed at the base of the array of nanotubes; the thickness of this barrier layer may be controlled by varying anodizing parameters. Palladium (Pd) or other noble metal such as Platinum (Pt) may be deposited atop the array of nanotubes (step 74, FIG. 6) by using a metal deposition technique such as: sputtering, evaporation using thermal energy, E-beam evaporation, ion assisted deposition, ion plating, electrodeposition, screen printing, chemical vapor deposition, molecular beam epitaxy (MBE), electroless deposition, and laser ablation. A plurality of metal electrode-contacts (step 76, FIG. 6) such as gold, Pt, Pd, Ruthenium, Al, indium tin oxide, fluorine-doped tin oxide, and various alloys thereof, may be deposited atop the nanotube array.

EXAMPLE 1

Figure 1A:
FIGS. 1A–1E depict one preferred alternative nanotube array structure at various stages of fabrication, according to the invention, in chronological, step-wise fashion; similar features of the five cross-sectional views are labeled, accordingly.
Figure 1B:
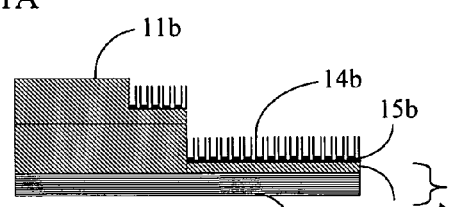
Figure 1C:
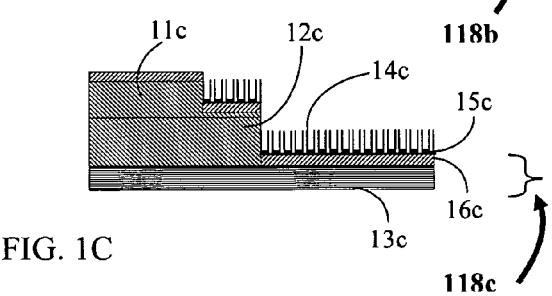
Figure 1D:
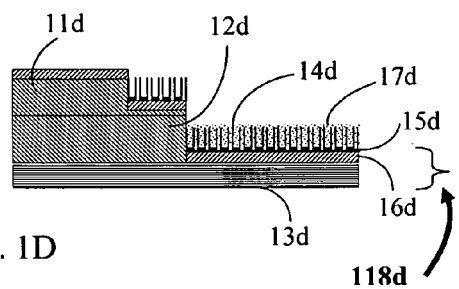
Figure 1E:
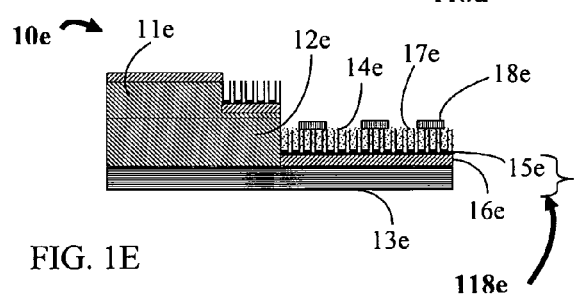
Figure 2A:
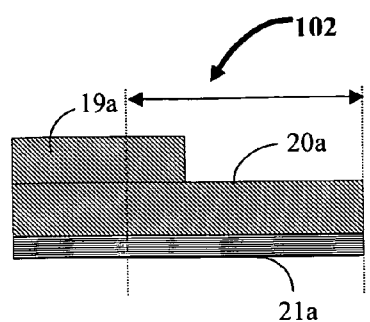
FIGS. 2A–2F depict another preferred alternative nanotube array structure at various stages of fabrication, according to the invention, in chronological, step-wise fashion; similar features of the six cross-sectional views are labeled, accordingly.
Figure 2D:
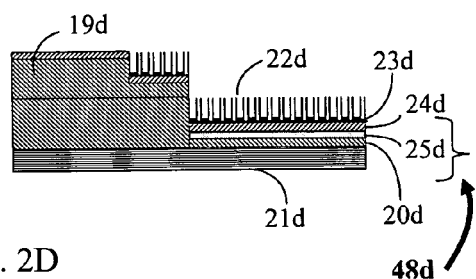

FIGS. 1A–1E depict a titanium metal coated substrate with a titanium layer 12a (of thickness 350–450 nm, by way of example) having been deposited over the surface of the substrate. Atop about, for example, ½ of the surface of layer 12a another titanium layer (of thickness, say, 800–10000 nm) 11a–11e has been deposited. A 'base' substrate 13a–13e of an electrically insulative material such as soda glass, silica glass/silicon, quartz, ceramic, or other generally inert supportive material preferably produced such that it has a generally smooth top surface, is ultrasonically cleaned; this substrate will be of suitable thickness selected for ease of handling/manufacturability in bulk, such as from 0.5 mm–1 mm. Deposition atop substrate 13a may be done at a selected temperature, such as ~500° C. per conventional techniques. For purposes of explanation, here, each assembly represented in FIGS. 1A, 2A, and 3A is divided into two regions, with the area of interest set out between two dashed lines, identified by an arrow 101, 102, 103, respectively. The assembly between the two dashed lines 101 is anodized by dipping into an electrolyte of selected constituents, such as 0.5% HF (Purity~48–51%) and acetic acid (Purity~99.7%) mixed in ratio 7:1, by way of example.

The anodization of titanium 12b (FIG. 1B) in an acidic electrolyte solution forms an array of titania nanotubes 14b. The duration of anodization helps control the thickness of titanium 12b left remaining under the titania nanotubes 14b. For example, it may be desirable to make 12b extremely thin to meet desired device resistive characteristics. Once anodization is finished, the assembly is removed from the electrolyte solution and rinsed in distilled water. By anodizing a partial double-layer assembly as in FIG. 1A, one can control the resulting nanotube structures formed during anodization in the area of interest 101. In each of FIGS. 1B–1E the integral support has been labeled for reference, respectively, 118b–118e. It has been found that oxidation occurs relatively faster on titanium layer at the electrolyte-air interface compared to any other immersed portion of a Ti layer 12a. By immersing the FIG. 1A assembly into electrolyte solution to the point were the area under arrow 101 is fully immersed, and the electrolyte-air boundary is at the left-hand dashed line (as opposed to immersing up to the edge of the second Ti layer 11a), one can avoid prematurely etching portions of Ti layer 12a before completion of anodization over the whole exposed area of the single Ti layer—thus producing a more-uniform array of nanotubes 14b. The resulting structure is titania nanotubes 14b atop a thin layer of titanium 12b atop insulative (e.g., glass) substrate 13b. The nanotubes within the array 14b–14e are ideally well separated from each other on top as shown, while their walls are connected at the nanotube baseline by a 'barrier' Ti oxide layer 15b–15e. Barrier layer may have a thickness of ~13 nm to 20 nm, for example, or might be made thinner depending upon target resistive characteristics. In this example, fluoride ions in electrolyte help in achieving tubular shape in titania and the presence of acetic acid makes the nanotubes mechanically robust.

To crystallize the anodized amorphous titania nanotubes, the assembly (FIG. 1C) is preferably annealed in a predominantly oxygen ambient at, say, ~450° C. (step 68, FIG. 6). Amorphous nanotubes are thus transformed into predominant rutile phase along with small fraction of anatase phase. The rutile phase is preferable for aiding in hydrogen sensing behavior; whereas the anatase phase in titania aids in achieving a photocatalytic property to promote contaminant removal/destruction functionality. This heat treatment step converts the thin titanium layer 12b underneath titania nanotubes into oxide, 16c–16e. The area of interest 101 of the assembly produces a hydrogen sensing device having a resistance value in GigaOhm range.

FIG. 1D depict the clusters of palladium, or other suitable noble metal, deposited 17d atop the as-annealed titania nanotubes 14d (step 74, FIG. 6). A thin layer (say, ~10 nm) of Pd has been deposited on the surface of titania nanotubes 14d. At this thickness, the Pd film is discontinuous and deposited as nanoclusters, 17d–17e. The Pd clusters/layer aids in achieving hydrogen absorption and desorption in titania nanotubes at room temperature. Atop the Pd sputtered titania nanotubes 14e (FIG. 1E) are a plurality of conductive electrode-contacts, 76 of FIG. 6; the electrode-contacts may be fabricated by deposition of a variety of suitable materials such as gold, Pt, Pd, Ruthenium, Al, indium tin oxide, fluorine-doped tin oxide, and various alloys thereof.

EXAMPLE 2

Turning to the embodiment depicted by FIGS. 2A–2F, this assembly has a titanium layer 20a–20f preserved between electrically insulative substrate 21a–21f and a couple of oxide layers 24d–f and 25d–25f (relatively dense). This sensing device may be operated at room temperature, permitting relatively fast response and recovery to hydrogen gas. Employing suitable conventional sensing circuitry (not shown for simplicity) provides a means by which the device can measure hydrogen gas due to the change in resistance experienced within measurable range of from Mohm to ohm (see, also, FIGS. 11a–11c). A base titanium layer 20a is deposited to coat substrate 21a (e.g., Ti layer 20a may have a thickness ~500–850 nm) and a second Ti layer 19a is deposited over roughly half of the surface of base Ti layer 20a (e.g., Ti layer 19a–19f may have a thickness 800–10000 nm). Once again, by anodizing a partial double-layer assembly as depicted in FIG. 2A, one can better control the resulting nanotube structures formed during anodization in the area of interest 102 between the two dashed lines. In each of sectionals in FIGS. 2B–2F, the integral support has been labeled for reference, respectively, 48b–48f.

Figure 2B:
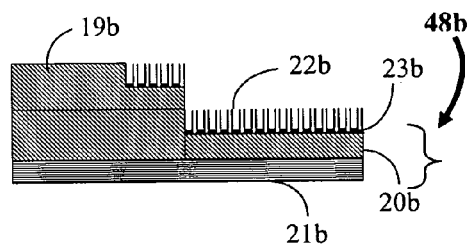
Figure 2E:
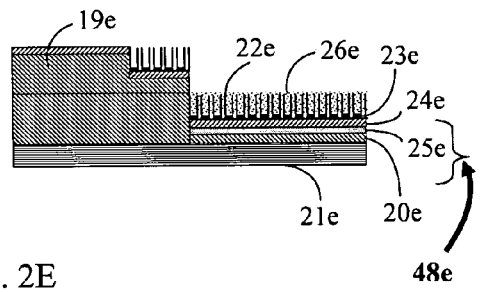

As depicted in FIG. 2B the anodization of titanium layer 20a is performed by dipping the assembly in an acidic electrolyte solution such as acetic acid mixed HF solution (e.g., 0.5% HF and 13% acetic acid) to form titania nanotubes 22b. The duration of anodization has been selected, here for example, so that a relatively thick titanium layer, 20b, remains. For example, the duration of anodization at, say, 10V can be anywhere between 8 and 10 minutes for a Ti layer 20a ~550 nm thick: Resulting length of the nanotubes is expected to be less than or close to ~550 nm. As explained in connection with FIG. 1A, an advantage of depositing a second titanium layer 19a–19f is to avoid etching titanium at the electrolyte-air interface before the completion of anodization over the base Ti layer 20a–20f. The nanotubes formed 22b–22f are oriented with open end outwardly-directed (upwardly) and a thin oxide 'barrier' layer at the base, 23b–23f. Though each nanotube as shown (ideally) interconnected at the base of the nanotube, walls of adjacent nanotubes are often in-contact somewhere between middle and bottom: This random nature to the wall thickness (es) and shapes of nanotubes formed, can be better appreciated by reviewing the side-view/sectional SEM images in FIGS. 5b, 9b.

Figure 2C:
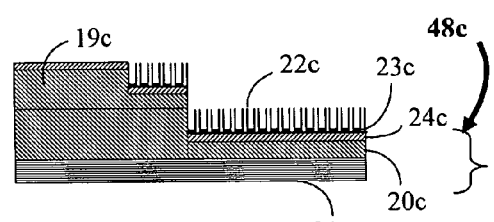
Figure 2F:
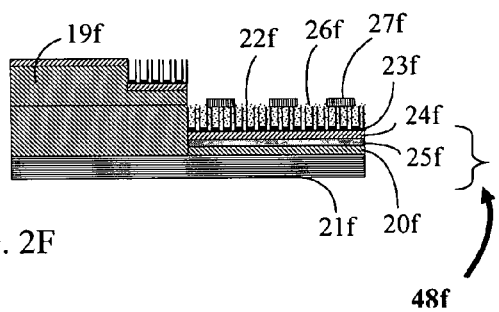

FIG. 2C assembly has been annealed at 440° C. in oxygen ambient; the nanotubes attain a rutile phase (step 68, FIG. 6); moreover, a thin oxide layer 24c is also formed just below the barrier layer 23c. The resulting structure is titania nanotubes 22c/oxide layer 24c/titanium layer 20c. Leaving a thick Ti layer 20c beneath annealed nanotubes 22c can cause an electrical short therethrough if (this may happen during wire bonding of leads to electrode-contacts 27f, or when a combination of silver paste and epoxy is used for lead connection—step 77, FIG. 6). Here, as shown, a relatively dense passive oxide layer 25d–25f is formed at the base of titania nanotubes 22b–22f to address this. This oxide layer may be formed, for example, via anodizing the annealed sample in 0.05 to 0.1M KOH solution (step 72, FIG. 6). Predictably, anodization of titanium from 25V to 76V in 0.1 to 0.6M KOH results in formation of a dense passive oxide layer which is of rutile phase. Note that the titania nanotubes may dissolve or otherwise be destroyed in KOH solution either for too-high starting anodization voltage and/or if the nantotube structures are left in this electrolyte solution for too long. To address this, one may select a lower starting anodization voltage, say, 25V and then ramp voltage up from 25V to 36V at 3V step-increments where the current density is permitted to stabilize at about 2 mA/cm$^2$ each time before making a step-change in voltage. This post-annealing treatment permits a 'fix' of other electrical shorting routes throughout the assembly, such as small cracks or pinholes, by forming an oxide layer-coating on exposed metal parts.

Palladium or other noble metal clusters are then deposited 26e–26f atop as-annealed titania nanotubes 22e–22f (step 74, FIG. 6). For example, a thin layer (~10 nm) of palladium may be deposited on the surface of titania nanotubes via resistive boat heating, or other suitable techniques as mentioned. At such thickness, the deposited metal would be discontinuous and result in the formation of 'nanoclusters' (see, also, FIG. 7 at 17e). The Pd clusters promote catalytic 'breaking' of hydrogen molecules into atomic form and allow diffusion of the hydrogen into the titania nanotubes at room temperature. These nascent forms of hydrogen are highly reactive and immediately absorbed into the walls of titania nanotubes. Upon hydrogen infusion into the lattice of titania, its semiconducting state switches to metallic state. Electrode-contacts 27f are then deposited atop the titania nanotubes for interconnection with leads that permit electrical communication with suitable sensing circuitry (steps 76, 77, 78, FIG. 6). The features of the FIG. 2F device, operational as a room temperature hydrogen sensor (step 79, FIG. 6), as depicted within area of interest 102 include: Pt or other conductive material, electrode-contacts 27f/Pd (discontinuous layer) 26f/titania nanotubes (predominantly rutile phase) 22f/titania oxide (rutile & porous) 24f/titanium dioxide (passive & dense, rutile) 25f/titanium 20f/glass, or other insulative, substrate 21f.

EXAMPLE 3

The resultant assembly of the fabrication steps depicted by FIGS. 3A–3F is a device having a thin aluminum layer 29f beneath an alumina nanoporous structure/layer 34f underneath a Ti oxide layer 33f which is below the barrier layer 32f at the base of titania nanotubes 31f. In each of sectionals in FIGS. 3C–3F, the integral support has been labeled for reference, respectively, 38b–38f: It is below the titania barrier layer(s) 32c–32f. The hydrogen sensing device depicted is operable in a wide range of temperature with high sensitivity. Electrical connections from the structure in FIG. 3F can be made either using a suitable wire bonder apparatus or using a combination of silver paste and epoxy. A ~20 nm–50 nm thick aluminum layer 29a (-29f) is first deposited atop a glass, silicon, etc. wafer, 30a (-30f) of a thickness suitable for handling during fabrication. Next, a ~550 nm–850 nm thick Ti layer 28a (-28f) is deposited atop aluminum layer 29a (-29f). The substrate is kept at 250° C., for example, during a Ti/Al bilayer deposition. Once again, by anodizing a partial double-layer assembly as depicted in FIG. 3A, one can better control the resulting nanotube structures formed during anodization in the area of interest 103 between the two dashed lines.

Figure 3B:
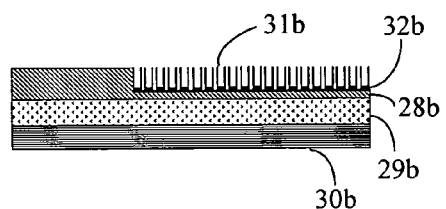
Figure 3C:
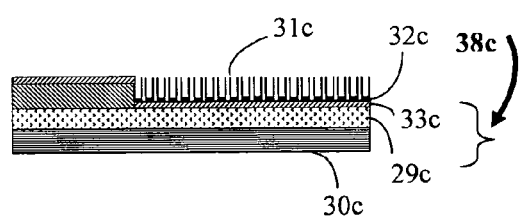
Figure 3D:
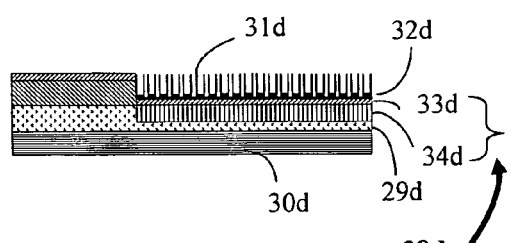
Figure 3E:
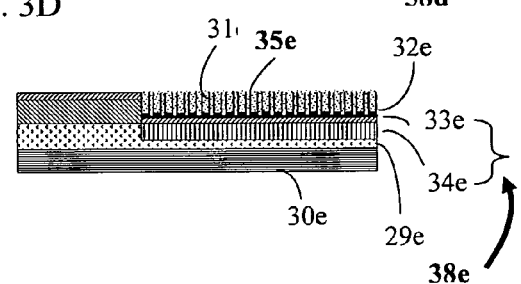
Figure 3F:
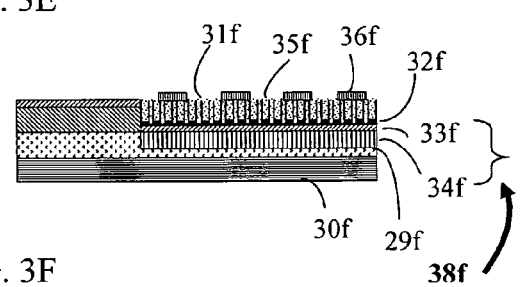

The area of interest 103 is dipped into an electrolyte solution, such as 0.5% HF plus acetic acid, for the anodization of titanium into nanotubes 31b (FIG. 3B). Duration of anodization has been chosen, here, such that by-and-large the whole thickness of titanium layer 28a is formed into titania nanotubes 31b. The underlying aluminum layer 29a aids in maintaining the nanotube structure intact until anodization reaches the base of the nanotubes. During anodization, once the barrier layer of nanotubes breaks, the underlying aluminum 29b is exposed to electrolyte, indicated by a sudden jump in current density. Just before this point, the anodized device is taken out of the electrolyte and rinsed thoroughly with distilled water and, later, dried. Another advantage of utilizing an underlying aluminum layer 29b is to prohibit the etching of titanium at the electrolyte-air interface in a manner as is describe above in connection with FIGS. 1A–1E. The nanotubes, 31b–31f, are ideally well separated from each other on top while they are connected in the bottom by an oxide layer. Nanotubes are oriented with open ends outwardly-directed (at top) with a barrier layer at the bottom, 32b–32f. The as-anodized titania nanotubes are heat treated, e.g., by being annealed at 450° C. in a predominantly oxygen ambient. The nanotubes 31c attain a rutile phase. A thin oxide layer 33c is formed just below barrier layer 32c. The resulting structure at 103 is titania nanotubes 31c with barrier layer 32c/thin oxide layer 33c/aluminum layer 29c (FIG. 3C).

Annealed samples are then anodized (FIG. 3D) at, for example, 40V in 0.25M oxalic acid solution kept at 2° C. using ice-cooled water bath thus, forming an alumina nanoporous structure, 34d–34f. Oxalic acid, a weak electrolyte, does not destroy titania nanotubes during anodization. The resulting structure is titania nanotubes with barrier 32d/thin titanium oxide layer 33d/alumina 34d/thin aluminum 29d–29f/substrate 30d. Palladium or other noble metal is deposited over titania nanotubes forming clusters—e.g., thin layer (~10 nm) of palladium may be deposited via thermal evaporation method forming nanoclusters, 35e–35f. Finally, in FIG. 3F, platinum (for example) electrode-contacts 36f are dc sputter deposited over palladium coated titania nanotubes.

EXAMPLE 4

FIG. 4 is an isometric representation of an array structure of titania nanotubes 42 formed from titanium (99.5% pure from Alfa Aesar, Ward Hill, Mass., USA) of thickness 0.25 mm. The anodization was performed in an electrolyte medium of 0.5% hydrofluoric HF acid (J. T. Baker-Phillipsburg, N.J., USA) in water, using a platinum foil cathode. Well-defined nanotube array 42 was grown using anodizing potentials ranging from 12 V to 20 V. FIGS. 5a–5b are representative images of a titania nanotube array: FIG. 5a is a top-plan view FE-SEM image and FIG. 5b a side-view cross-sectional FE-SEM image. Nanotube length increases with anodization time, reaching a length of 400 nm in approximately 20 minutes, and then remained constant: Samples were anodized for 25 minutes. The samples were then annealed at 500° C. in pure oxygen ambient for 6 hours, with a heating and cooling rate of 1° C./minute. Device 40 has a base titanium metal foil 44/45 (may include other layers, as described above in connection with FIGS. 1–3) with a nanotube array 42, atop. An 'insulating' barrier layer 43 separates the nanotubes from the integral support member 44/45. A pressure contact was used to electrically contact the nanotubes with two spring-loaded parallel 10 mm by 2 mm platinum contact pads 46 (100 μm thickness). Nanotube arrays prepared using an anodization potential of 20 V and annealed at 500° C. for 6 hours in a pure oxygen ambient were ~400 nm in length and had a barrier layer 43 thickness of ≈50 nm. For the nanotubes fabricated using 20 V anodization, the average pore diameter, as determined from FESEM images, is ~76 nm, with a wall thickness of ~27 nm. The sample anodized at 12 V was found to have an average pore diameter of ~46 nm with a wall thickness ~17 nm.

FIG. 6 is a flow diagram depicting details of a method 60 for producing titania nanotube array structures—illustrated are core, as well as further distinguishing/additional, features of the invention for producing structures such as those represented and/or depicted in FIGS. 1A–1E, 2A–2E, 3A–3E, 4, 5A–5B, 7, and 9A–9B. In addition to reference and discussion made throughout this disclosure of the novel steps of method 60, in connection with other figures, further description of the steps follow:

Clean Substrate: A substrate, if used, is preferably cleaned 62 prior to depositing titanium or co-depositing titanium and a dopant atop a generally smooth surface. Suitable cleaning techniques include those available: ultrasonicated in water containing mild cleaning solution followed by immersing in boiling chromic acid solution for ~10 minutes, then a second wash and drying. If titanium foil or a doped-titanium foil is used, suitable thickness is selected and prepared for anodization 64b.

Titanium Deposition: Deposition of thin film titanium is performing using rf sputtering, thermal evaporation, etc. on suitably sized substrate size held to desired temperature (a parameter of interest). Regarding temperature of deposition of titanium layer: Adhesion of the samples deposited at room temperature using either sputtering or thermal evaporation may produce a titania nanotube array of less than suitable. Higher temp deposition produces more structurally sound devices. By way of example only, radio frequency (rf) sputtering was done at a power of 300W at an argon pressure of 5 milli torr. The films were deposited at a rate of about 0.09 nm/sec. A film thickness of 550 nm or 350 nm were used for anodization. The substrates were rotated at a speed of 10 rotations per minute (rpm) to promote more-uniform film. The heating and cooling rates were 10° C./min and 3° C./min respectively, with vacuum on the order of $5\times10^{-8}$ torr.

Masked deposition of titanium second layer (FIG. 1A at 11a, FIG. 2A at 19a): A second layer of titanium may be coated atop the first layer (12a, 20a) after masking half the area; by way of example, thickness of the second layer may be ~800 nm to 1 micron. The second layer may be deposited using rf sputtering, thermal evaporation, and so on. By way of example, deposition may be performed as followed: a graphite boat may be used for evaporating titanium pellets; half the area of the substrate along the width is covered with a stainless mask; deposition may be done at 250° C. and 5° C./min and 3° C./min, heating and cooling rates respectively, with a deposition rate of 2 nm/sec, at a vacuum of $\sim5\times10^{-7}$ torr.

Anodization: The assembly is then anodized in an electrolyte (step 65, FIG. 6). By way of example, anodization may be done as follows: using electrolyte consisting of hydrofluoric acid 0.25 to 1.5 vol % HF (49 to 51% concentrated) and acetic acid (quantity of acetic acid was maintained constant at 13 vol %) in deionized water. The range of voltage in which the nanotubes are formed vary with the HF concentration in the electrolyte. Anodization may be done at room temperature with a platinum foil as cathode, as follows: Connect the thicker portion of the Ti film and platinum foil to the positive and negative terminals of the dc power supply, respectively, using copper clips, then apply suitable voltage between the electrodes and then immersing them inside the electrolyte. Alternatively, the electrodes can be simultaneously inserted inside the electrolyte and switch on the power immediately. Although nanotubes can be grown using anodization potentials ranging from 6V to 20 V, a potential of 10 V may be used. For a particular voltage, the greater the voltage the larger will be the nanotube diameter. Adjusting the electrolyte solution recipe, thickness of Ti layer, voltage, and/or duration of time, permits a considerable amount of control over geometric features of nanotubes formed. By way of example only, an electrolyte solution may comprise KF (0.1M), $K_2HPO_4$ (0.1M), and $H_2SO_4$, (5%) to anodize a Ti layer (having a thickness of up to ~10 microns) at 10V for 21 hours to produce nanotubes several microns (up to ~7000+ nm) in length; or an electrolyte solution may comprise KF (0.1M) with $H_2SO_4$, (5%–10%) to anodize a Ti layer at 10V for 1 hour to produce nanotubes ~50 nm pore diameter, or at 15V to ~30V to produce nanotubes having pore diameter ~100 nm.

FIG. 6 steps 66, 67 point out an alternative for fabricating 'high' resistance devices whereby a Ti layer of at least 400 nm thickness is used. If a 'low' resistance device is sought, a thicker Ti layer may be anodized (e.g., ~550 nm or larger) and no second shorter anodization (step 67) is required. Devices of the invention made from titanium foil or doped-titanium foil (step 64b) are typically exempt from a second shorter anodization 67. Where, as mentioned, a metal layer (step 70) is interposed between an electrically insulative substrate and the titania nanotube array, a basic (e.g., KOH) or weaker acidic electrolyte may be used for anodizing to control the resistance, R, of the device—reducing the thickness of the metal layer by forming a metal-oxide therefrom.

While doing the anodization at a constant potential, the current will reduce with time. For example, a current of ~70 to 80 mA can be observed at the beginning of the process. This will drop down to around 8 mA within a time of around 8 minutes. A metal layer may be left underneath the nanotube after this process. For preparing high resistance sensors (step 66) for operation at elevated temperatures, preferably, most or all of a metal layer underneath the nanotubes is removed: After first anodization, the Ti layer was washed and dried and subjected to a second anodization (may be same electrolyte) for a shorter time, step 67. For example, total time for first plus second anodization may be ~11 minutes. The metal layer becomes very thin (<~30 to 40 nm) after second anodization. Note that the metal layer cannot be removed completely by simply extending the duration of the first anodization. For low resistance sensors, a thicker metal layer is maintained and the second anodization is usually avoided.

Heat treatment: Heat treatment (step 68, FIG. 6), by way of example, may be done in a predominantly oxygen ambient at approximately 430 to 450° C. with heating and cooling rates were set at 1° C./min, dwell time ~6 hours. Other gases may be mixed with the oxygen, e.g., nitrogen, argon, and other gas constituents that will not cause undesirable degradation or undesirable reaction of the nanotube array structure. Structures having a metal layer underneath the nanotubes may be subjected to an additional treatment (step 72) to reduce the thickness of this metal layer to better control the overall resistance of the devices. This treatment may be done by anodization in potassium hydroxide (KOH), dilute hydrofluoric acid containing electrolyte, and so on. During this process the unoxidized metal film underneath the nanotubes gets oxidized. The resistance of the sample can be adjusted by selecting the treatment parameters.

By way of example(s): In the case of KOH treatment, the arrays may be anodized in a 0.05 to 0.1 molar solution of potassium hydroxide in deionized water, with platinum foil as cathode. The voltage may initially be held at 25V. After performing the anodization for a few minutes at constant 25V, i.e., when the current drops down to about 2 mA, voltage may be increased to 36V using incremental 2V step increases (each respectively made after current reduces to 2 mA). After reaching 36V, the anodization may be maintained until current reduces to less than ~0.8 mA (Note: 2 mA=0.83 mA/cm$^2$ (8 A/m$^2$); 0.8 mA=0.33 mA/cm$^2$ (3.3 A/m$^2$).) In the case of dilute HF treatment, the samples may be anodized in an electrolyte consisting of 0.25 vol % hydrofluoric acid in deionized water. A potential of 10V is applied; when the current reduced to a value of about 3 mA the voltage may be ramped to 23V at a rate of 3 to 4V/minute. As soon as the voltage reaches 23V, the array is removed (Note: 3 mA=1.25 mA/cm$^2$ (12.5 A/m$^2$)).

Pd (noble metal) coating: Once again, as mentioned, nanotube array is sprinkled with an ultra thin layer of palladium, or other suitable noble metal (step 74). By way of example, deposition may be done using thermal evaporation without heating the array, at initial vacuum of ~5×10$^{-7}$ torr, deposition rate of ~0.1 nm/sec, thickness from ~8 to 13 nm. Pd clusters are preferably distributed over the surface of the nanotubes rather than forming a continuous layer. It is critical that palladium not block the hydrogen reaching the nanotubes walls/titania. If the palladium layer is too thick and continuous the sensitivity of the sensor will be reduced. A tungsten boat may be used for evaporating thin Pd wire.

Pt electrodes: By way of example, to deposit electrode-contacts (step 76), masks may be made mechanically with an array of holes of size 0.5 mm separated by a distance of 0.5 mm. The deposition of Pt may be done using dc sputtering. The thickness of resulting Pt electrode: ~40 nm. Any two circular electrodes from the array of electrodes on the sample could be used for measuring the sensitivity.

Wire bonding: By way of example, electrical leads may be connected to the electrodes using either silver epoxy or wire bonding, or other suitable technique (step 77); gold wires may be used as leads. Care is taken to avoid scratching electrodes. For wire bonding a 1 mil gold wire was connected using a capillary wire bonder on to the Pt electrodes.

Packaging: Packaging of the assembly (step 78) may be done using known suitable packaging materials and techniques. By way of example, the nanotube/substrate assembly may be firmly affixed on a stainless steel base using silver epoxy. The leads in electrical communication and extending from the electrode-contacts may also be connected to the conducing pins of the package using silver epoxy. A perforated stainless steel dome may be attached to the base to protect the nanotube/substrate device, yet permit gas to pass therethrough for sensing (step 79).

EXAMPLE 5

Figure 7:
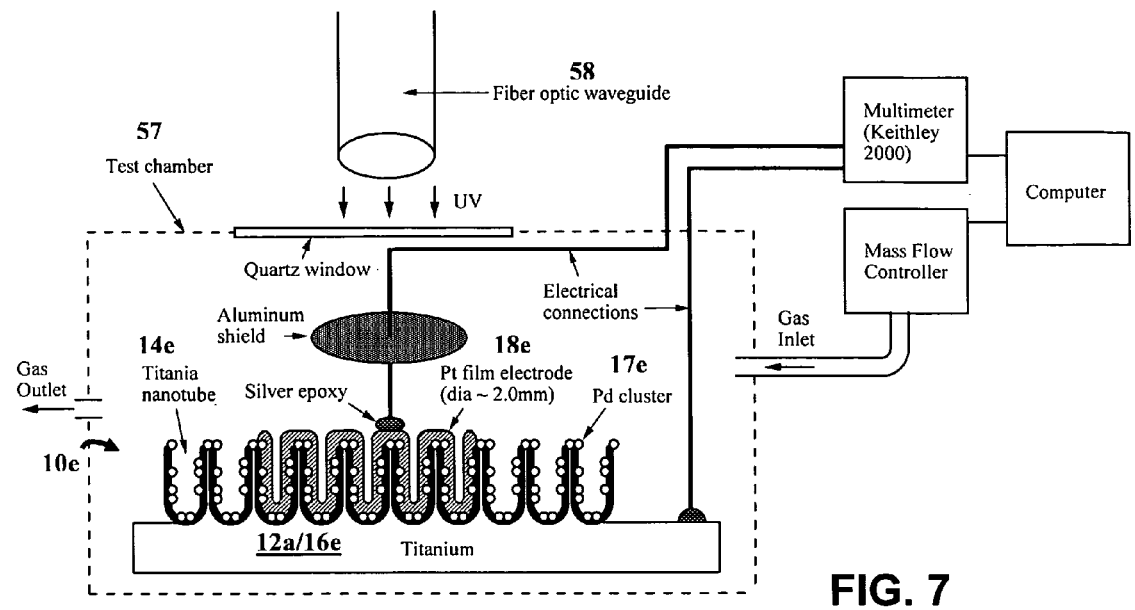
FIG. 7 is a schematic representation of experimental setup employed for testing various aspects of the electrical resistive devices of the invention.

FIG. 7 is a schematic representation of experimental setup employed for testing various aspects of the electrical resistive devices of the invention. The assembly 10e (schematically represented in FIG. 1E) has an electrical contact 18e on the surface comprised of an rf-sputtered platinum pad ~2.0 mm in diameter, and an electrical contact to the underlying integral support member made up of various or one layer (12a/15e/16e). A 3.0 mm diameter aluminum disk was placed approximately 3.0 mm directly above the platinum contact, shading it from the UV illumination to prevent degradation of the electrical contact. Measurements were taken at room temperature, ~24° C., within a 60 cm$^3$ Plexiglas test chamber 57, with an opening for introducing the motor oil onto the sensor surface, and a quartz window for passing the UV -illumination onto the device surface. Different grades of motor oil, 20W-50, 20W-40, 5W-30 and 10W-40 were used as contaminants, by way of example, as a rather extreme challenge to the sensing capabilities of device 10e. A contaminated device was uniformly illuminated by 365 nm UV light, directed from the source (e.g., 150 W mercury xenon lamp) to the device surface through the use of a fiber optic waveguide 58 to eliminate the possibility of (over)heating the device surface.

Figure 8A:
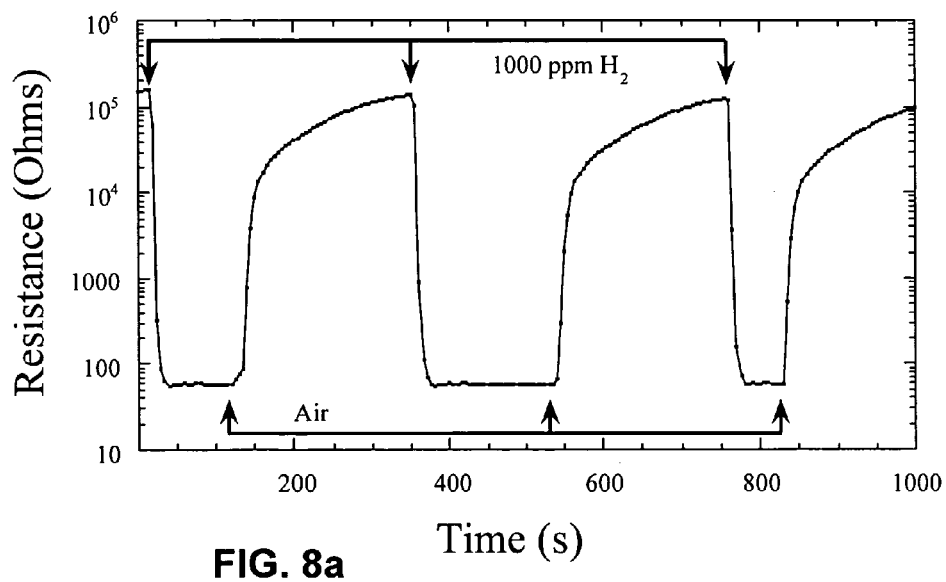
FIGS. 8a–8d collectively, graphically depict a plot of real-time variation of resistance change before, during, and after exposing a titania nanotube array to radiant UV energy (e.g., via waveguide 58, FIG. 7) in the presence of oxygen to remove a contaminant substance, here, liquid crude petroleum (e.g., 10W30 motor oil). Full plot is broken into four sections.
Figure 8B:
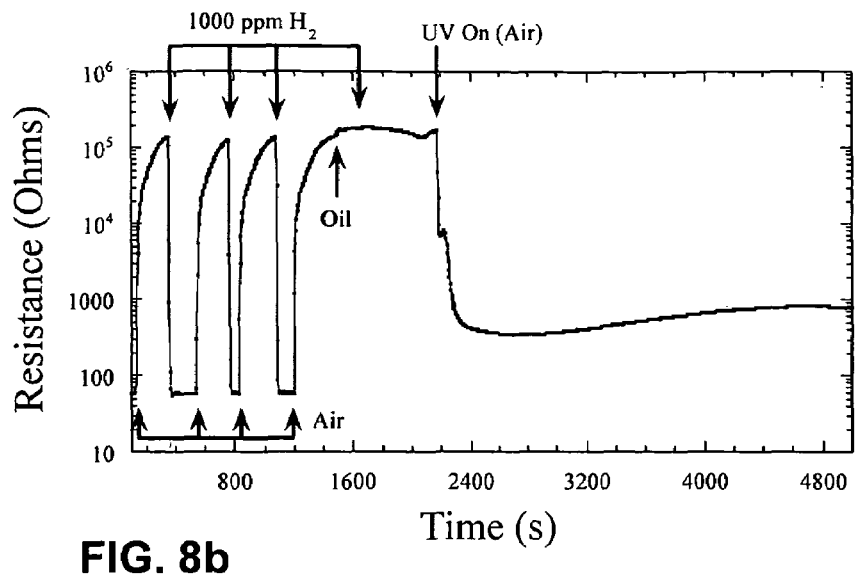
Figure 8C:
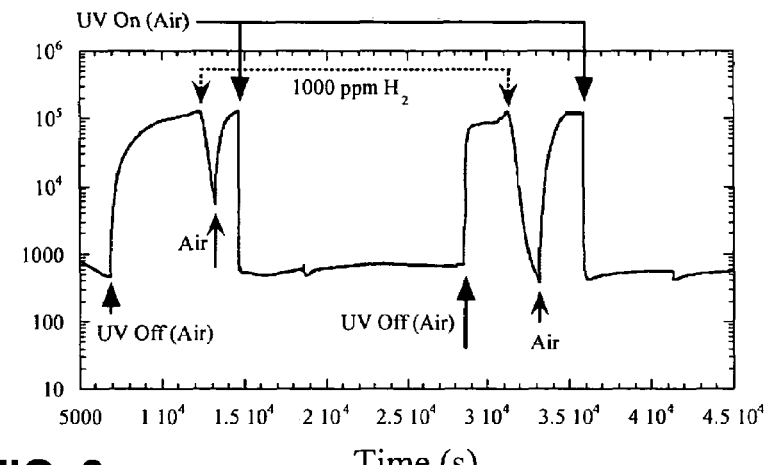

FIGS. 8a–8d collectively, graphically depict a plot of real-time variation of resistance change before, during, and after exposing a titania nanotube array to radiant UV energy (e.g., via waveguide 58, FIG. 7) in the presence of oxygen to remove a contaminant substance, here, liquid crude petroleum (e.g., 10W30 motor oil) using a configuration such as that depicted in FIG. 7. For simplicity and purposes of discussion, the full plot is broken into four sections: FIG. 8a (device behavior from t=10 s to 1000 s), FIG. 8b (t=100 s–6000 s); FIG. 8c (t=5000 s–45,000 s); and FIG. 8d (t=45,000 s–70,000 s).

FIG. 8a plots sensing device behavior from time 10 s to 1000 s, prior to being contaminated: the device is cyclically exposed to hydrogen gas which, as one can see, causes a measurable change in resistance of the device for use as a hydrogen gas sensor. FIG. 8b shows sensing device behavior over time 100 s to 6000 s during which the device is contaminated with oil losing its hydrogen sensing capabilities. The oil-contaminated region on the device was uniformly illuminated with UV light in the presence of air. The section of the plot in FIG. 8c depicts behavior from time 5000 s to 45,000 s. The recovery of the device's hydrogen sensing capability after UV illumination of one-hour duration can be appreciated. At time 7000 s the UV is turned off, with the device regaining its nominal starting resistance of approximately 100,000 Ohms, at which point it is exposed to 1000 ppm hydrogen and shows relative change in resistance of approximately 50. The device is again exposed to UV, from roughly time 15,000 s to 29,000 s. After this second UV exposure the device is again exposed to 1000 ppm hydrogen, showing an approximate factor of 500 change in electrical resistance. The device is once again exposed to UV, from time 36,000 s.

Figure 8D:
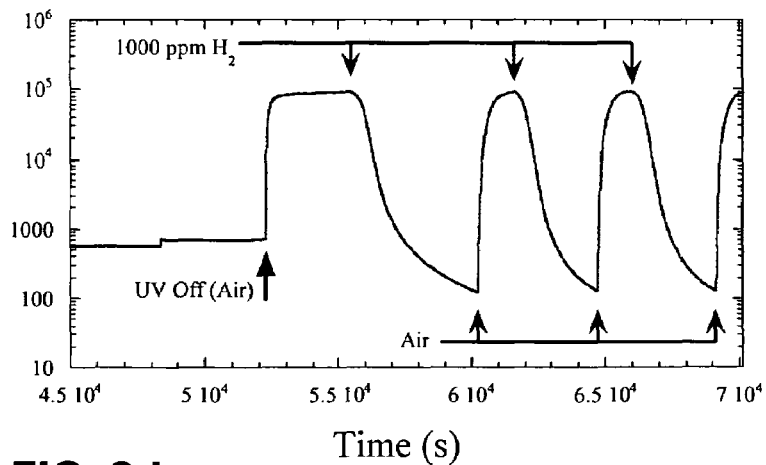

The FIG. 8d section of the plot depicts behavior from time 45,000 s to 70,000 s—with UV exposure of the sensor to time 52,000 s, after which the sensor is repeatedly cycled between air and 1000 ppm hydrogen showing a relative change in impedance of approximately 1000. When compared to the hydrogen sensitivity of a non-contaminated sensing device, the relative response of the 'recovered' sensor is with-in a factor of two. The clean and recovered sensor have similar resistance values with exposure to air; the recovered sensor has a 1000 ppm hydrogen resistance value of approximately 100 Ω compared to the 60 Ω value of the sensor prior to contamination. Note that the electrical resistance of the device experiences a rapid drop with UV illumination due to photogeneration of charge carriers; after the radiant UV energy source is turned off, resistance is regained.

EXAMPLE 6

FIG. 8e graphically depicts another plot (a semi-log plot) of real-time variation of resistance change before, during, and after exposing a titania nanotube array to radiant UV energy in the presence of oxygen to remove a contaminant (once again, liquid crude petroleum). Nanotube wall thickness and shape, surface area and length are factors in enhancing the photocatalytic efficiency on which the self-cleaning, or contaminant removal, capabilities. When the feature size of the titania structure is less than ≈25 nm, the wave function of the charge carriers spreads throughout the structure hence the photogenerated electrons and holes are readily accessible to the donors or acceptors on the surface resulting in a high degree of photocatalysis. The nanotubes used to prepare plot in FIG. 8e were fabricated from a titanium foil by anodization, as described herein, with an insulating barrier layer separating the nanotube array from the remaining titanium foil. The electrolyte solution was comprised of acetic acid and 0.5% hydrofluoric acid. A 10 V anodization was used, with the resulting amorphous titania nanotubes having, approximately, a 22 nm inner diameter and 13 nm wall thickness. While the amorphous nanotubes showed little hydrogen sensitivity or photocatalytic properties, once annealed at 500° C. for 6 h in oxygen ambient to crystallize the nanotubes (primarily in the anatase phase but with some rutile crystals on the barrier layer), sensitivity to hydrogen was greatly enhanced. The resulting nanotubes were mechanically robust, oriented vertically to the basal plane of the titanium foil (having surface area of 38 $m^2/g$)— for example, see FIGS. 9a–9b which are, respectively, top-plan view and side-view cross-sectional SEM images of a titania nanotube array structure fabricated according to the invention.

The FIG. 8e plot depicts the self-cleaning, or contaminant removal, capabilities of this nanotube array device (measurements taken at room temperature and a gas flow rate of 1000 sccm). The sample chamber is initially flushed with compressed air; soon after, a 2500 ppm mixture of hydrogen and nitrogen is passed through the test chamber until the resistance stabilizes. The test gas is then switched to air, followed by hydrogen concentrations of 1000 ppm and 500 ppm. The clean sensor is then contaminated with a thin, estimated at a few hundred micron, layer of motor oil applied by dropper. As can be seen, after contamination the sensor resistance stays essentially constant demonstrating negligible response to hydrogen. Yet after exposing the sensor to UV light for 6,650 s (111 minutes) the titania array device regains its initial baseline resistance and hydrogen gas sensitivity. UV exposure of the sensor leads to a dramatic reduction in resistance due to charge carrier generation.

Figure 10A:
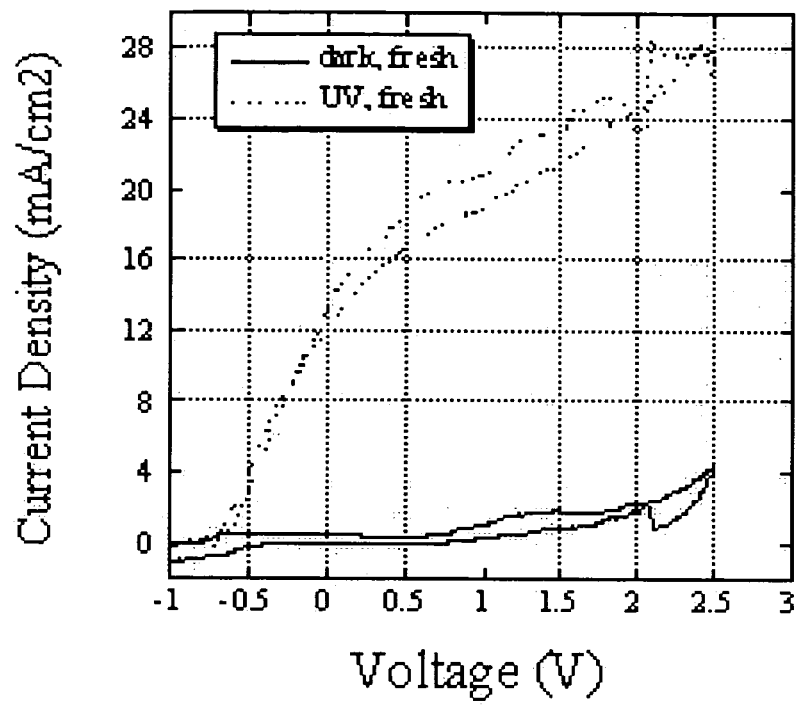
FIGS. 10a–10b graphically depict, as voltammogram curves, taken in the dark and under illumination of a UV lamp providing radiant flux to the nanotube array(s).
Figure 10B:
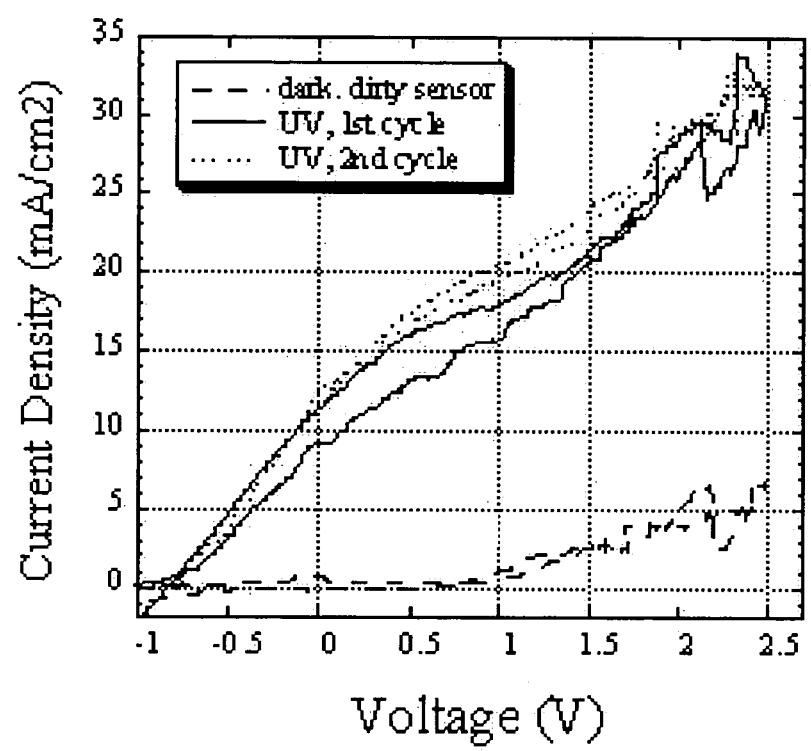

FIGS. 10a–10b graphically depict, as voltammogram curves, taken in the dark and under illumination of a UV lamp providing radiant flux to the nanotube array(s), such as those depicted in FIGS. 9a–9b. Photocatalysis is the phenomenon where light absorbed by a semiconductor generates highly reactive radicals, which then undergo redox reactions with chemicals on the surface of the semiconductor. $TiO_2$ is one of the best photocatalytic materials; it is also relatively inexpensive, stable and widely available. Two crystalline forms of $TiO_2$, anatase (band gap 3.2 eV) and rutile (band gap 3.0 eV), are photocatalytically active, with anatase being more active than rutile. Photocatalytic activity is induced by incident photons of wavelength smaller than about 385 nm (ultraviolet range), which results in electrons from the valence band to be energized to the conduction band forming electron-hole pairs; these electron-hole pairs are responsible for the photocatalytic activity, as delineated in the following equations. Conduction band electron and valence band hole formation by incident UV light $$TiO_2 + h\upsilon \rightarrow TiO_2^- + OH. \text{ (or } TiO_2^+\text{)} \qquad \text{Eqn. (1)}$$

Electron-hole pairs thus formed recombine unless the charges are scavenged by traps. Oxidation of organic compounds takes place through the hydroxyl radical (Eqn. 1) in the presence of oxygen (though some suggest that direct valence band hole oxidation takes place in certain cases).

$$OH. + O_2 + C_nO_mH_{(2n-2m+2)} \rightarrow \rightarrow \rightarrow nCO_2 + (n-m+1)H_2O \qquad \text{Eqn. (2)}$$

Hydrogen peroxide ($H_2O_2$), which contributes to the killing of microorganisms, can also be formed by the following reactions $$2OH. \rightarrow H_2O_2 \qquad \text{Eqn. (3)}$$

$$2HO_2^- \rightarrow H_2O_2 + O_2$$

The overall quantum efficiency of the photocatalytic process is determined by the competition between electron-hole recombination and charge trapping, and by the competition between trapped charged recombination and interfacial charge transfer (which leads to Eqn 2). Thus, an increase in the recombination time or increase in the interfacial charge transfer rate enhances photocatalytic reactivity. Strategies to achieve this include: using dye sensitizers to improve response to visible light, doping $TiO_2$ with metal ions, coating the $TiO_2$ surface with noble metals like platinum and palladium, and making composite or fused particles of $TiO_2$ with a smaller band gap semiconductor. Additionally, nanotube wall thickness may be adjusted to obtain grain sizes of ~10 nm.

$TiO_2$ is capable of photocatalytically destroying many bacteria, viruses, fungi and yeasts. Bacteria can be destroyed by the reaction of hydroxyl radicals and superoxide ions (Eqn 1) with the cell wall (superoxide cannot penetrate the cell wall due to negative charge), and/or by the penetration of $H_2O_2$ (Eqn 3) into the cell. $H_2O_2$ reacts with iron ions inside the cell to generate more damaging hydroxyl radicals (Fenton reaction); thus, once $H_2O_2$ is generated, the destruction process can continue via this reaction in bacteria cells containing transition metal ions, even in the absence of UV light (e.g., at night). In case of spores, though their thick wall is impermeable to most damaging agents, it has been reported that $H_2O_2$ and organic peroxides can penetrate freely. Thus, the Fenton reaction can occur in this case too since spores contain transition metal ions. Once the outer coat of spores is destroyed by this reaction, the protoplast and membrane are subject to lethal attack by hydroxyl and superoxide radicals.

Viruses, which need a living host cell to survive and reproduce, bind to the host cell receptor sites through specific sites on the surface of the virus; thus, viruses can be disabled by destroying their surface binding sites so that they cannot bind to a host cell. This can be achieved by the photocatalytic action of $TiO_2$, since the radicals generated by UV light (Eqn 1) attack the surfaces of microorganisms most readily. Viruses that have been reported to be destroyed photocatalytically by $TiO_2$ are Phage Qβ, Phase MS-2, Poliovirus 1, *Lactobacillus* Phage PL-1. Yeast and fungi which have been reported to be destroyed photocatalytically by $TiO_2$ are *Saccharomyces cerevisiae, Candida albicans*, and *Hyphomonas polymorpha*. Thus, $TiO_2$ induced photocatalytic killing of biological molecules is viable.

EXAMPLE 7

The powerful photocatalytic properties of nanotubes arrays produced according to the invention may be demonstrated by cyclic voltammetry of clean and motor oil contaminated Pd coated samples: FIG. 10a plots results for clean Pd coated samples and FIG. 10b plots results for oil contaminated samples. Electrolyte was 1N KOH and an Ag/AgCl reference electrode was used in a three-electrode cell. Cyclic voltammogram curves were taken both in the dark and under illumination of a UV lamp providing a radiant flux density of ≈170 mW/cm2 at 365 nm. As seen, the dark currents at positive potentials are low, but upon illumination drastic changes in the behavior at positive potential are seen; this is a result of the onset of photocurrent, generated from oxidative processes that occur via hole capture. The anodic current density at 0.5, 1.5, and 2.5 V are 2384, 27.3, and 6.5 times higher than in the dark, reaching to a maximum of about 30 mA/cm2. In the case of motor oil contaminated samples, the first cycle shows a slight improvement of the photo-oxidation current showing that photocatalytic oxidation of motor oil is taking place. After one cycle, the behavior once again becomes similar to that of a clean electrode, showing that motor oil is completely oxidized in one cycle. The maximum photocatalytic efficiency observed in these experiments was approximately 4%.

EXAMPLE 8

Figure 11A:
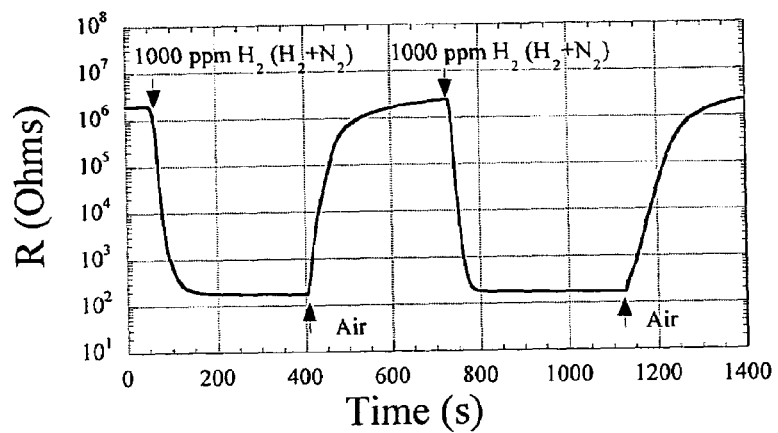
FIGS. 11a–11c graphically depict performance of the hydrogen sensing capability of the titania nanotube arrays, according to the invention, under various conditions.
Figure 11B:
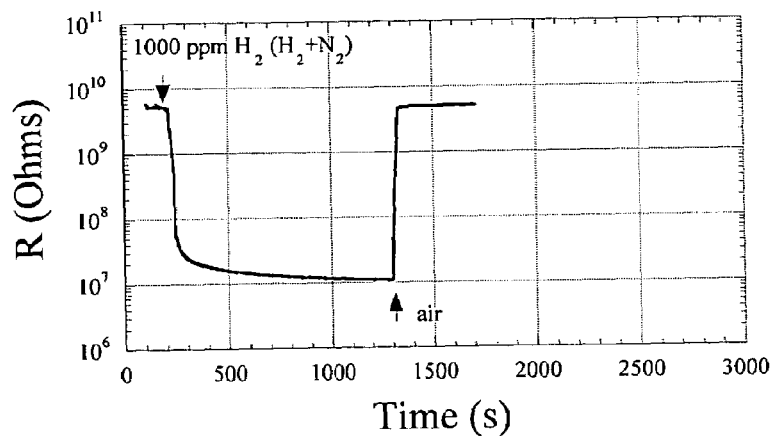
Figure 11C:
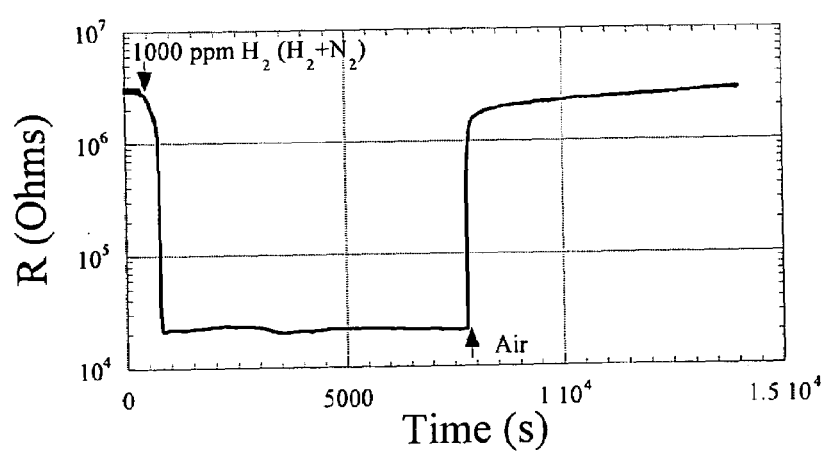

FIGS. 11a–11c graphically depict performance of the hydrogen sensing capability of an example titania nanotube array(s), according to the invention, under various conditions. For those structures represented by way of example only, here, a high sensitivity of more than four orders in magnitude was observed for 1000 ppm hydrogen at room temperature when a low (relatively speaking, low refers to a starting resistance of about $10^6$ Ohms) resistance sensor was employed. FIG. 11a graphically depicts response of a 'low' resistance device when the environment was switched from air to 1000 ppm hydrogen (hydrogen mixed with nitrogen) and then switched back to air, at room temperature. Turning to FIG. 11b, in the case of high (relatively speaking, high refers to a starting resistance of about $10^9$ Ohm) resistance sensing device, a three order variation in resistance was observed at room temperature. FIG. 11b is a plot showing the response of this type of device to 1000 ppm hydrogen, at room temperature. Regarding FIG. 11c, the 'high' resistance sensing devices operate well to 300° C., operational temp. FIG. 11c is a plot showing the response of the high resistance device at 300° C. to 1000 ppm $H_2$.

While certain representative embodiments and details have been shown for the purpose of illustrating the invention, those skilled in the art will readily appreciate that various modifications, whether specifically or expressly identified herein, may be made to these representative embodiments without departing from the novel core teachings or scope of this technical disclosure. Accordingly, all such modifications are intended to be included within the scope of the claims. Although the commonly employed preamble phrase "comprising the steps of" may be used herein, or hereafter, in a method claim, the Applicants do not intend to invoke 35 U.S.C. §112 ¶6. Furthermore, in any claim that is filed herewith or hereafter, any means-plus-function clauses used, or later found to be present, are intended to cover at least all structure(s) described herein as performing the recited function and not only structural equivalents but also equivalent structures.

What is claimed is:

1. A method of producing an electrical resistive device, the method comprising the steps of:
    (a) forming an array of titania nanotubes open at an outwardly-directed end by anodizing at least a portion of a first titanium layer;
    (b) prior to said anodizing, depositing said first titanium layer atop an integral support member, which comprises an electrically insulative substrate layer, by performing a deposition process selected from the group consisting of: sputtering, evaporation using thermal energy, E-beam evaporation, ion assisted deposition, ion plating, electrodeposition, screen printing, chemical vapor deposition, molecular beam epitaxy (MBE), and laser ablation; and
    (c) after said step of depositing said first titanium layer and prior to said anodizing, depositing a second titanium layer, leaving a portion of said first titanium layer uncovered for said forming said array of titania nanotubes.

2. The method of claim 1;
further comprising, after said anodizing, the steps of:
heat treating said away of titania nanotubes in the presence of oxygen; and
depositing a plurality of metal electrode-contacts atop said titania nanotubes so formed.

3. The method of claim 1:
    (a) wherein the electrical resistive device so produced is adapted for sensing hydrogen gas;
    (b) wherein said anodizing comprises exposing an outwardly-directed surface of said first titanium layer to an acidic electrolyte solution comprising a fluoride compound and an acid at a voltage selected from the range from 6V to 25V, for a selected time-period within the range of 1 hour to 24 hours; and
    (c) further comprising, after said step of forming said away, the step of depositing a plurality of palladium clusters atop said array of titania nanotubes.

4. A method of producing an electrical resistive device for sensing hydrogen gas, the method comprising the steps of:
    (a) forming an array of titania nanotubes open at an outwardly-directed end by anodizing at least a portion of a titanium layer;
    (b) prior to said anodizing, depositing an aluminum layer atop an electrically insulative substrate layer;
    (c) after said step of depositing said aluminum layer, depositing said titanium layer atop said aluminum layer by performing a deposition process selected from the group consisting of: sputtering, evaporation using thermal energy, E-beam evaporation, ion assisted deposition, ion plating, electrodeposition, screen printing, chemical vapor deposition, molecular beam epitaxy (MBE), and laser ablation; and
    (d) after said anodizing, heat treating said away of titania nanotubes in the presence of oxygen forming a titanium-oxide layer interposed between said aluminum layer and said array of titania nanotubes.

* * * * *